United States Patent
Lu et al.

(10) Patent No.: US 8,189,784 B2
(45) Date of Patent: May 29, 2012

(54) COMMUNICATION SYSTEM, AND AN ENCODING DEVICE AND A DECODING DEVICE THEREOF

(75) Inventors: Kai-Yi Lu, Taipei County (TW);
Chih-Hsien Kung, Tainan County (TW);
Yung-Lu Chiu, Chiayi County (TW);
Chang-Shing Chi, Tainan County (TW)

(73) Assignee: Chang Jung Christian University, Tainan (TW)

( * ) Notice: Subject to any disclaimer, the term of this patent is extended or adjusted under 35 U.S.C. 154(b) by 325 days.

(21) Appl. No.: 12/715,169

(22) Filed: Mar. 1, 2010

(65) Prior Publication Data
US 2010/0220859 A1 Sep. 2, 2010

(30) Foreign Application Priority Data
Mar. 2, 2009 (TW) ............................. 98106652 A

(51) Int. Cl.
*H04K 1/00* (2006.01)
(52) U.S. Cl. .................................. 380/255; 380/28
(58) Field of Classification Search .................. 380/255, 380/28
See application file for complete search history.

(56) References Cited

U.S. PATENT DOCUMENTS

| 6,898,756 B1* | 5/2005 | Fekri et al. .................. 714/786 |
| 2002/0018561 A1* | 2/2002 | Emelko ......................... 380/28 |
| 2003/0012372 A1* | 1/2003 | Cheng ............................ 380/28 |
| 2003/0223579 A1* | 12/2003 | Kanter et al. ................. 380/28 |

* cited by examiner

*Primary Examiner* — Philip Chea
(74) *Attorney, Agent, or Firm* — Osha • Liang LLP

(57) ABSTRACT

A communication system includes encoding and decoding devices. The encoding device includes an encrypting module adapted for encrypting an original signal into an encrypted signal, and an error correction encoding module coupled to the encrypting module for receiving the encrypted signal therefrom, and generating an output signal by performing error correction encoding on the encrypted signal. The decoding device includes an error correction decoding module for receiving an input signal via a transmission channel, and a decrypting module. The input signal is a result of the output signal combined with noise. The error correction decoding module generates a recovery signal from the input signal by performing error correction decoding on the input signal. The decrypting module is coupled to the error correction decoding module for receiving the recovery signal therefrom, and generates a decrypted signal that corresponds to the original signal by decrypting a portion of the recovery signal.

21 Claims, 10 Drawing Sheets

US 8,189,784 B2

COMMUNICATION SYSTEM, AND AN ENCODING DEVICE AND A DECODING DEVICE THEREOF

CROSS-REFERENCE TO RELATED APPLICATION

This application claims priority of Taiwanese Application No. 098106652, filed on Mar. 2, 2009.

BACKGROUND OF THE INVENTION

1. Field of the Invention

The invention relates to a signal transmission technique, more particularly to a communication system, and an encoding device and a decoding device thereof.

2. Description of the Related Art

As shown in FIG. 1, in a conventional communication system 900, a transmitter 94 utilizes an error-correcting encoder 95 to perform channel encoding on an original signal prior to transmitting the same to a receiver 96 in order to provide a better resistance to channel noise during transmission over a channel. The receiver 96, on the other hand, uses an error-correcting decoder 97 to perform corresponding channel decoding for recovering the original signal.

However, the conventional communication system 900 is only capable of ensuring, to a certain degree, accuracy of signal transmission, but cannot protect the message from unauthorized access. In other words, the conventional communication system 900 does not provide an encryption method such that any receiver in an open transmission environment may possibly intercept the message, resulting in a high safety uncertainty.

SUMMARY OF THE INVENTION

Therefore, the object of the present invention is to provide a communication system that can alleviate the aforesaid drawbacks of the prior art.

According to the present invention, there is provided a communication system that includes an encoding device and a decoding device. The encoding device includes an encrypting module adapted for encrypting an original signal into an encrypted signal, and an error correction encoding module coupled to the encrypting module for receiving the encrypted signal therefrom, and generating an output signal by performing error correction encoding on the encrypted signal. The decoding device includes an error correction decoding module and a decrypting module. The error correction decoding module is adapted for receiving an input signal via a transmission channel. The input signal is the output signal generated by the error correction encoding module as affected by noise during transmission via the transmission channel. The error correction decoding module generates a recovery signal from the input signal by performing error correction decoding on the input signal. The decrypting module is coupled to the error correction decoding module for receiving the recovery signal therefrom, and generates a decrypted signal that corresponds to the original signal by decrypting a portion of the recovery signal.

According to another aspect of the present invention, there is provided the aforesaid encoding device.

According to yet another aspect of the present invention, there is provided the aforesaid decoding device.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
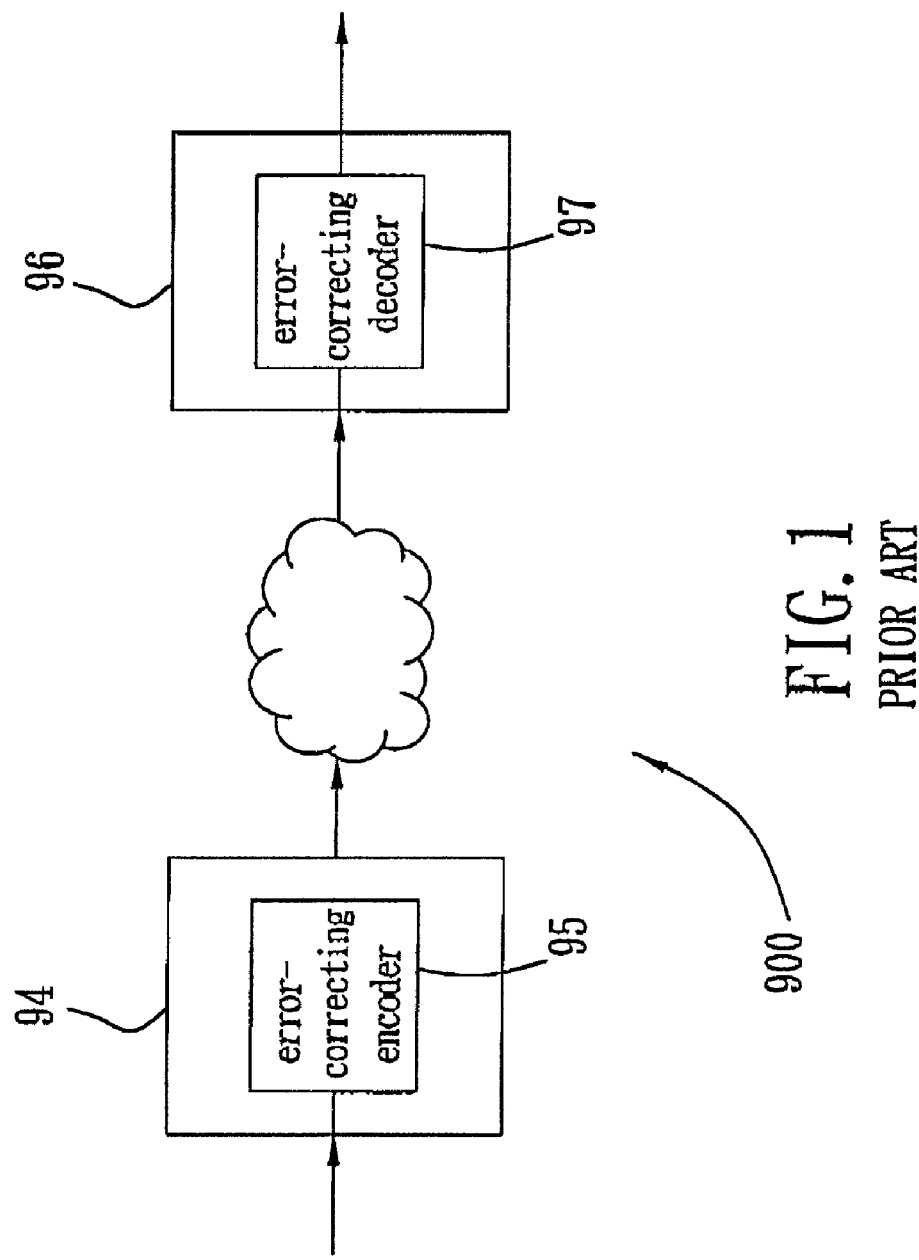
FIG. 1 is a schematic block diagram of a conventional communication system.
Figure 2:
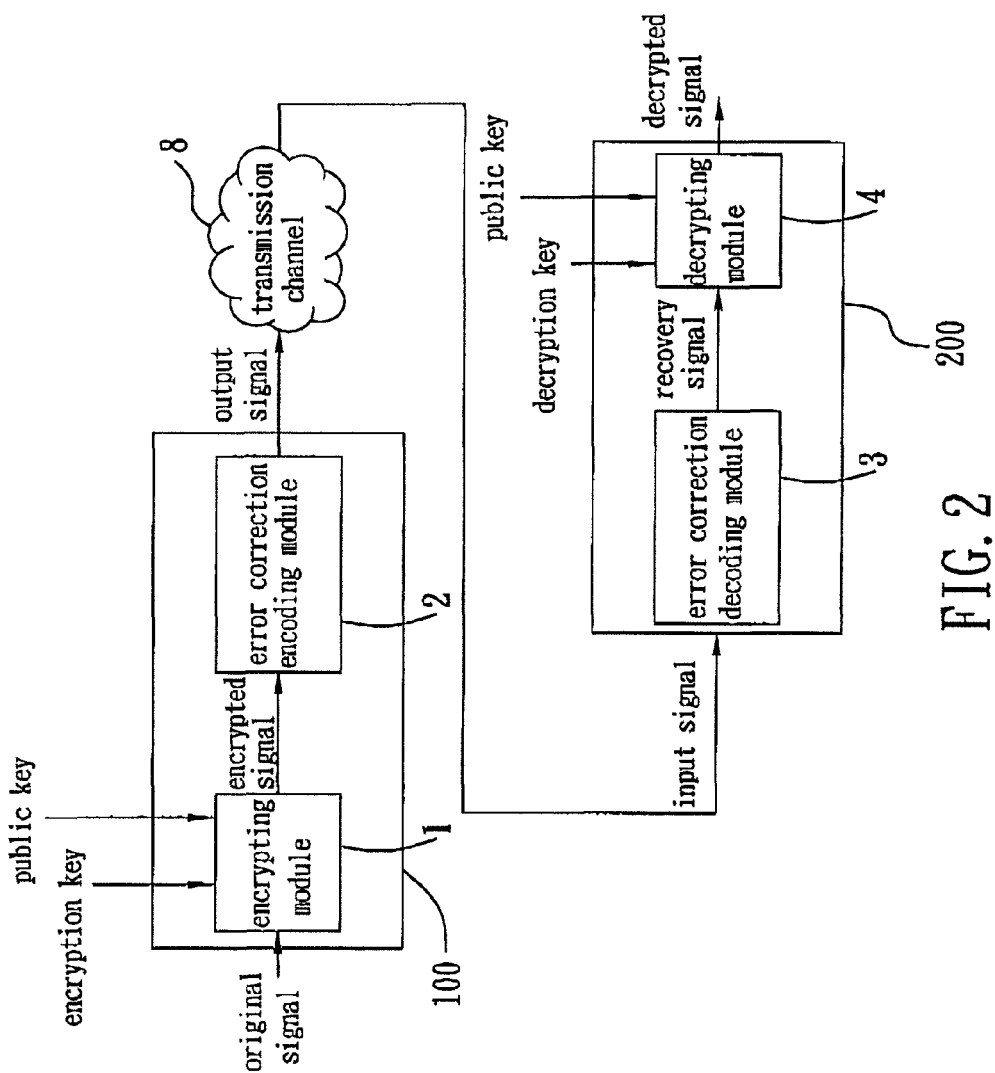
FIG. 2 is a schematic block diagram of the preferred embodiment of a communication system according to the present invention.

With reference to FIG. 2, the preferred embodiment of a communication system according to the present invention includes an encoding device 100 and a decoding device 200. The encoding device 100 includes an encrypting module 1 and an error correction encoding module 2. The decoding device 200 includes an error correction decoding module 3 and a decoding module 4. The communication system may be a digital television system, an electronic medical record system, or any other communication systems that require encryption protection. Moreover, the encrypting module 1 and the decrypting module 4 both belong to key cryptography modules that employ the Rivest-Shamir-Adleman (RSA) cryptography algorithm.

The encrypting module 1 is adapted for encrypting an original signal into an encrypted signal. The error correct ion encoding module 2 is coupled to the encrypting module 1 for receiving the encrypted signal therefrom, and generates an output signal by performing error correction encoding on the encrypted signal. Therefore, the output signal is not only protected by encryption, but also has better anti-noise ability during transmission.

The error correction decoding module 3 of the decoding device 200 receives an input signal via a transmission channel 8, and generates a recovery signal from the input signal by performing error correction decoding on the input signal. The input signal is the output signal generated by the error correction encoding module 2 as affected by noise during transmission via the transmission channel 8. The decrypting module 4 is coupled to the error correction decoding module 3 for receiving the recovery signal therefrom, and generates a decrypted signal that corresponds to the original signal by decrypting the recovery signal.

Figure 3:
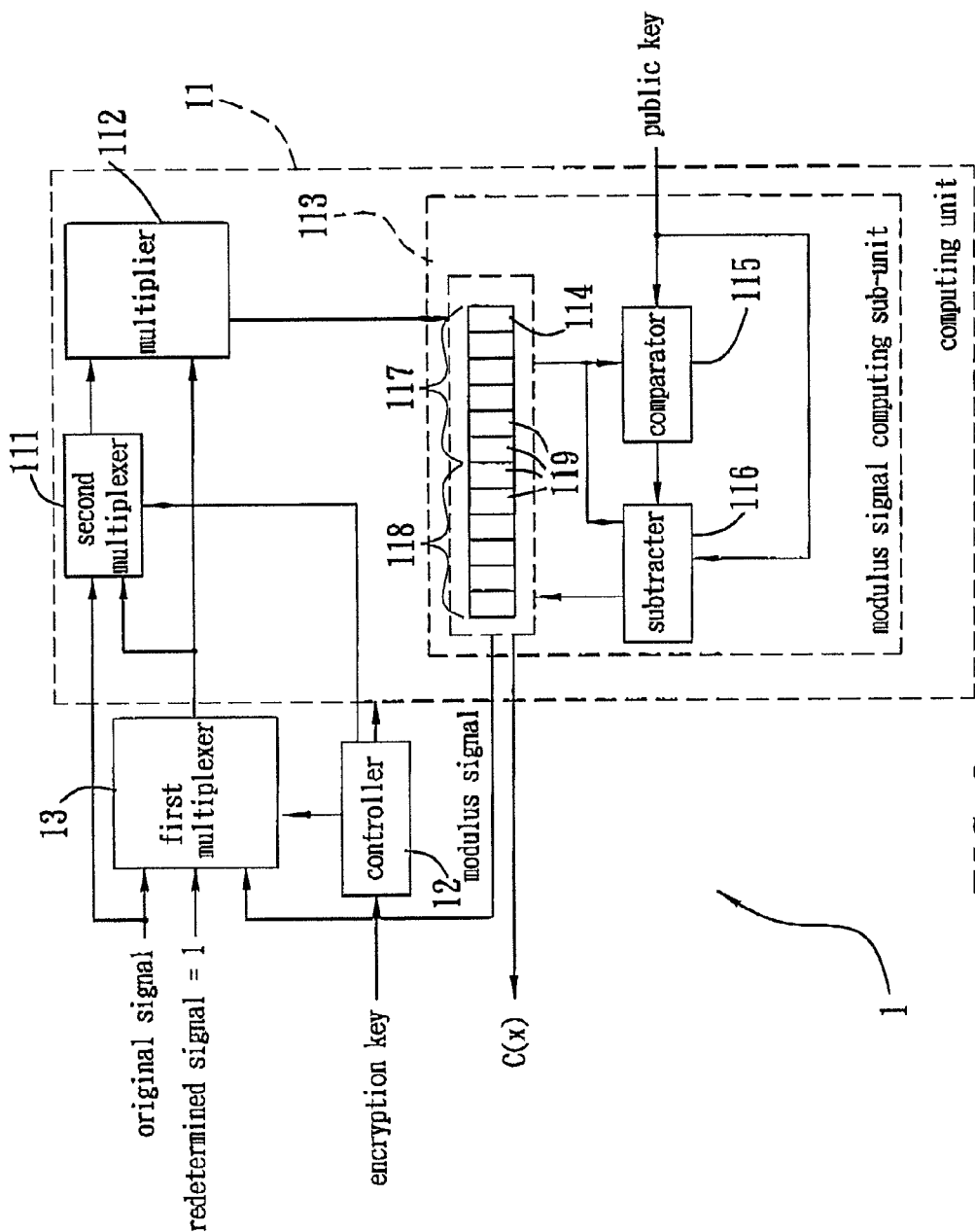
FIG. 3 is a schematic block diagram, illustrating an encrypting module of an encoding device according to the preferred embodiment.

With reference to FIG. 3, the encrypting module 1 of the encoding device 100 encrypts the original signal into the encrypted signal according to an h-bit encryption key (e), where (h) is not smaller than one, i.e., h≧1. The encrypting module 1 is adapted for receiving the (h) number of bits ($e_{h-1}$, $e_{h-2}$, . . . , $e_1$, $e_0$) of the encryption key (e) in sequence from a most significant bit ($e_{h-1}$) to a least significant bit ($e_0$), and encrypts the original signal into the encrypted signal according to a public key (N) and the encryption key (e) thus received. In particular, the encrypted signal is generated according to the following Formula 1.

$$C = M^e \bmod N \quad \text{(Formula 1)}$$

where "mod" denotes the mathematical operation of finding a remainder after a division operation, (C) denotes a modulus signal, and (M) denotes the original signal.

The encrypting module 1 includes a computing unit 11, a controller 12, and a first multiplexer 13. The computing unit 11 is adapted for receiving the original signal, the public key (N), and a multiplexer output signal. The controller 12 is coupled electrically to the computing unit 11, and is adapted for receiving the bits ($e_{h-1}$, $e_{h-2}$, . . . , $e_1$, $e_0$) of the encryption key (e) in sequence from the most significant bit ($e_{h-1}$) to the least significant bit ($e_0$). The first multiplexer 13 is coupled electrically to the controller 12 and the computing unit 11, is adapted for receiving the original signal and the modulus signal, and is controlled by the controller 12 to output the multiplexer output signal.

For each bit received by the controller 12 and determined by the controller 12 to be a bit other than the most significant bit ($e_{h-1}$), the controller 12 controls the computing unit 11 to perform modulus computation processing for generating the modulus signal with reference to the original signal, the public key (N), and the multiplexer output signal. To carry out encryption according to Formula 1, the modulus computation processing is computed according to at least one of the following Formulae 2 and 3:

$$C = C \times C \bmod N \quad \text{(Formula 2)}$$

$$C = C \times M \bmod N \quad \text{(Formula 3)}$$

where (C) represents the modulus signal, and (M) represents the original signal.

When the bit received is a second most significant bit ($e_{h-2}$) of the encryption key (e), the controller 12 controls the first multiplexer 13 to output one of the original signal and a predetermined signal as the multiplexer output signal according to a value of the most significant bit ($e_{h-1}$) of the encryption key (e), and controls the computing unit 11 to perform the modulus computation processing according to a first modulus computation for generating the modulus signal with reference to the multiplexer output signal and the public key (N). The predetermined signal is a signal representing "binary 1" in this embodiment. The first modulus computation is conducted according to the abovementioned Formula 2.

When the bit received is the second most significant bit ($e_{h-2}$) and when a value of the second most significant bit ($e_{h-1}$) matches a predetermined value, which is "binary 1" in this embodiment, the controller 12 further controls the first multiplexer 13 to output the modulus signal generated according to the first modulus computation as the multiplexer output signal, and further controls the computing unit 11 to perform the modulus computation processing according to a second modulus computation for generating the modulus signal with reference to the original signal, the public key (N), and the multiplexer output signal. The second modulus computation is conducted according to the abovementioned Formula 3.

When the bit received is a bit other than the most significant bit ($e_{h-1}$) and the second most significant bit ($e_{h-2}$) of the encryption key (e), the controller 12 controls the first multiplexer 13 to output the modulus signal as the multiplexer output signal, controls the computing unit 11 to perform the modulus computation processing according to the first modulus computation with reference to the multiplexer output signal and the public key (N), and further controls the computing unit to perform the modulus computation processing according to the second modulus computation for generating the modulus signal with reference to the original signal, the public key (N), and the multiplexer output signal when a value of the bit matches the predetermined value and after the modulus computation processing according to the first modulus computation is completed.

Upon determining that the bit received is the least significant bit ($e_0$) of the encryption key (e), the controller 12 enables the computing unit 11 to output the modulus signal as the encrypted signal upon completion of the modulus computation processing according to the first modulus computation when a value of the least significant bit ($e_0$) does not match the predetermined value, and upon completion of the modulus computation processing according to the second modulus computation when the value of the least significant bit ($e_0$) matches the predetermined value.

For purpose of illustration, it is assumed that the original message is decimal "13", the encryption key (e) is binary "1011", and the public key (N) is decimal "35". The process of encrypting the original signal into the encryption signal according to the preferred embodiment of the present invention is tabulated in Table 1.

TABLE 1

| Bit of the Encryption Key (e) | Formula | Value of (C) |
|---|---|---|
| $e_3 = 1$ | C = M | 13 |
| $e_2 = 0$ | C = C × C mod N | 13 × 13 mod 35 = 29 |
| $e_1 = 1$ | C = C × C mod N | 29 × 29 mod 35 = 1 |
|  | C = C × M mod N | 1 × 13 mod 35 = 13 |
| $e_0 = 1$ | C = C × C mod N | 13 × 13 mod 35 = 29 |
|  | C = C × M mod N | 29 × 13 mod 35 = 27 |

Result: the encrypted signal is decimal "27"

In this embodiment, the computing unit 11 includes a second multiplexer 111, a multiplier 112, and a modulus signal computing sub-unit 113.

The second multiplexer 111 is adapted for receiving the original signal, is coupled electrically to the first multiplexer 13 for receiving the multiplexer output signal therefrom, and is further coupled electrically to the controller 12. The second multiplexer 111 is controlled by the controller 12 to output the multiplexer output signal as a multiplier input signal during the first modulus computation, and to output the original signal as the multiplier input signal during the second modulus computation.

The multiplier 112 is coupled electrically to the first and second multiplexers 13, 111 for respectively receiving the multiplexer output signal and the multiplier input signal therefrom, and provides a multiplier output corresponding to a product of the multiplexer output signal and the multiplier input signal.

The modulus signal computing sub-unit 113 is coupled electrically to the multiplier 112 for receiving the multiplier output therefrom, and computes the modulus signal with reference to the multiplier output thus received and the public key (N). In this embodiment, the modulus signal computing sub-unit 113 includes a shift register 114, a comparator 115 and a subtracter 116. The shift register 114 includes a first half 117 and a second half 118. Each of the first and second halves 117, 118 includes (R) number of cascaded storage members 119, where (R) is a positive integer. An output of an $(N)^{th}$ one of the storage members 119 is coupled electrically to an input of an $(N+1)^{th}$ one of the storage members 119, where (N) is a positive integer ranging between 1 and (R−1). An output of the $(R)^{th}$ one of the storage members 119 of the first half 117 is coupled electrically to an input of the first one of the storage members 119 of the second half 118. The first half 117 is coupled electrically to the multiplier 112 for receiving the multiplier output therefrom in a first period during the modulus computation processing. The multiplier output is expressed in (R) number of bits, and each bit of the multiplier output is stored in a corresponding one of the storage members 119. Content in each of the storage members 119 is outputted to a subsequent one of the storage members 119 in each of a second period to a $(R+1)^{th}$ period during the modulus computation processing. The comparator 115 is coupled electrically to the second half 118 of the shift register 114 for extracting content in the second half 118 during each of the second period to the $(R+1)^{th}$ period, and determines whether the content is smaller than the public key (N). The subtracter 116 is coupled electrically to the second half 118 of the shift register 114 for extracting the content in the second half 118, and is further coupled electrically to the comparator 115. The subtracter 116 is enabled to subtract the content by the public key (N) and to update the content with result of the subtraction when it is determined by the comparator 115 that the content is not smaller than the public key (N). The second half 118 of the shift register 114 is coupled electrically to the first multiplexer 13, and outputs the content therein as the modulus signal to the first multiplexer 13 when the $(R+1)^{th}$ period has elapsed upon completion of the modulus computation processing.

Figure 4:
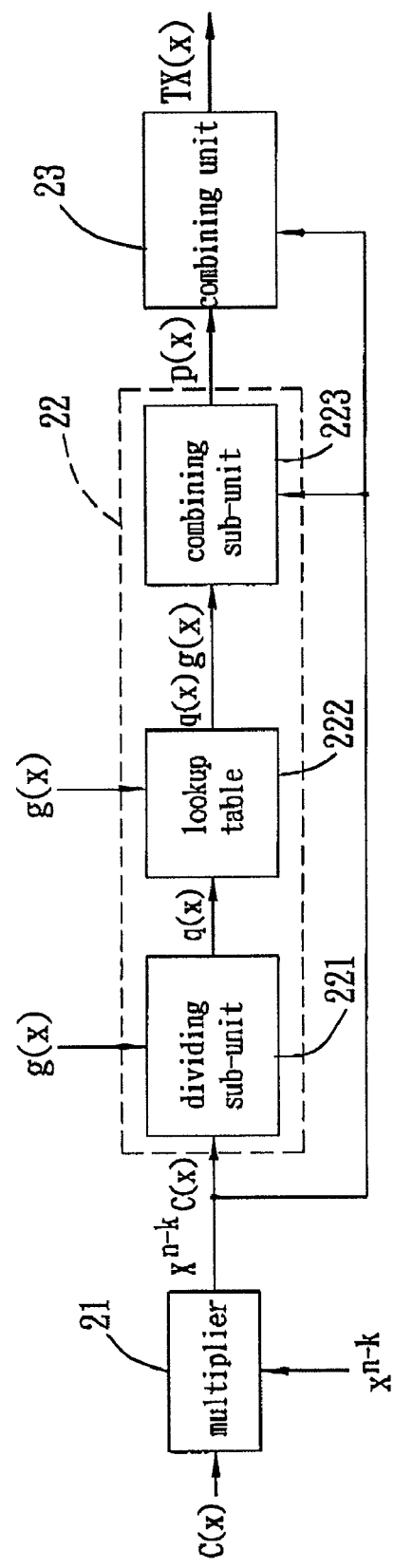
FIG. 4 is a schematic block diagram, illustrating an error correction encoding module of the encoding device according to the preferred embodiment.

With reference to FIG. 4, the error correction encoding module 2 of the encoding device 100 includes a multiplier 21, a modulus computing unit 22, and a combining unit 23. The error correction encoding module 2 operates in accordance with the Reed-Solomon (RS) encoding algorithm. The encrypted signal, which is the input of the error correction encoding module 2, includes (k) number of symbols, each of which has (m) number of bits, where (k) and (m) are both positive integers. Further, the output signal, which is the output generated by the error correction encoding module 2 of the encoding device 100 is to include (n) number of symbols, where (n) is a positive integer defined by the following relationship, $n=2^m-1$.

In particular, the error correction encoding module 2 generates the output signal according to the following Formulae 4 and 5.

$$p(x) = x^{n-k} \cdot C(x) \bmod g(x) \quad \text{(Formula 4)}$$

$$TX(x) = p(x) + x^{n-k} \cdot C(x) \quad \text{(Formula 5)}$$

where p(x) denotes an encoding modulus polynomial, $x^{n-k}$ denotes a first predetermined polynomial, C(x) denotes an encrypted polynomial that is representative of the encrypted signal, g(x) denotes a second predetermined polynomial, and TX(x) denotes an output polynomial that is representative of the output signal. The second predetermined polynomial g(x) is also referred to as a Reed-Solomon generator polynomial, is defined in a finite field (or Galois Field) of order $2^m$, which is denoted by $GF(2^m)$, and which has $2^m$ number of elements, namely, 0, $\alpha^0$, $\alpha^1$, $\alpha^2$, ..., $\alpha^{n-1}$. The second predetermined polynomial g(x) has (n−k) number of roots, namely $\alpha^1$, $\alpha^2$, ..., $\alpha^{n-k}$, and is defined as $g(x)=(x+\alpha^1)(x+\alpha^2) \ldots (x+\alpha^{n-k})$.

The multiplier 21 is coupled electrically to the encrypting module 1 for receiving the encrypted signal therefrom. The multiplier 21 multiplies the encrypted polynomial C(x) with the first predetermined polynomial $x^{n-k}$ so as to generate a multiplication polynomial $x^{n-k}C(x)$.

The modulus computing unit 22 is coupled electrically to the multiplier 21 for receiving the multiplication polynomial $x^{n-k}C(x)$ therefrom, and determines a remainder of the multiplication polynomial $x^{n-k}C(x)$ divided by the second predetermined polynomial g(x) so as to generate the encoding modulus polynomial p(x).

The combining unit 23 is coupled electrically to the multiplier 21 and the modulus computing unit 22 for respectively receiving the multiplication polynomial $x^{n-k}C(x)$ and the encoding modulus polynomial p(x) therefrom, and combines the multiplication polynomial $x^{n-k}C(x)$ with the encoding modulus polynomial p(x) so as to generate the output polynomial TX(x).

Computation of the encoding modulus polynomial p(x) will now be described. In this embodiment, the modulus computing unit 22 includes a dividing sub-unit 221, a lookup table 222, and a combining sub-unit 223. The dividing sub-unit 221 is coupled electrically to the multiplier 21 for receiving the multiplication polynomial $x^{n-k}C(x)$ therefrom, and determines a quotient of the multiplication polynomial $x^{n-k}C(x)$ divided by the second predetermined polynomial g(x) so as to generate an encoding quotient polynomial q(x). The lookup table 222 is coupled electrically to the dividing sub-unit 221 for receiving the encoding quotient polynomial q(x) therefrom, and outputs a multiple polynomial q(x)g(x) that is representative of a product of the encoding quotient polynomial q(x) and the second predetermined polynomial g(x). The combining sub-unit 223 is coupled electrically to the multiplier 21 and the lookup table 222 for respectively receiving the multiplication polynomial $x^{n-k}C(x)$ and the multiple polynomial q(x)g(x) therefrom, and generates the encoding modulus polynomial p(x) by subtracting the multiple polynomial q(x)g(x) from the multiplication polynomial $x^{n-k}C(x)$. In this embodiment, the combining sub-unit 223 is a logic XOR gate.

For purpose of illustration, assuming that the encrypted signal is (0001, 0001, 0001, 0001, 0001, 0001, 0001, 0001, 0001) with nine 4-bit symbols (i.e., k=9, and m=4), then $n=2^m-1=2^4-1=15$, and the finite field is $GF(2^4)$. The encrypted polynomial C(x) representative of the encrypted signal is defined as $C(x)=\alpha^0x^8+\alpha^0x^7+\alpha^0x^6+\alpha^0x^5+\alpha^0x^4+\alpha^0x^3+\alpha^0x^2+\alpha^0x^1+\alpha^0$. The first predetermined polynomial $x^{n-k}$ is $x^6$, and the second predetermined polynomial g(x) has n−k=15−9=6 number of roots, namely $\alpha^1, \alpha^2, \ldots, \alpha^6$, and is $g(x)=(x+\alpha^1)(x+\alpha^2) \ldots (x+\alpha^6)=\alpha^0x^6+\alpha^{10}x^5+\alpha^{14}x^4+\alpha^4x^3+\alpha^6x^2+\alpha^9x^1+\alpha^6$.

Then, the process of encoding the encrypted signal into the output signal is as follows. First, the multiplier 21 multiplies the encrypted polynomial C(x) with the first predetermined polynomial $x^6$ so as to generate the multiplication polynomial $x^{n-k}C(x)=x^6C(x)=\alpha^0x^{14}+\alpha^0x^{13}+\alpha^0x^{12}+\alpha^0x^{11}+\alpha^0x^{10}+\alpha^0x^9+\alpha^0x^8+\alpha^0x^7+\alpha^0x$. Second, the modulus computing unit 22 determines the remainder of the multiplication polynomial $x^6C(x)$ divided by the second predetermined polynomial g(x) so as to generate the encoding modulus polynomial $p(x)=\alpha^0x^5+\alpha^0x^4+\alpha^0x^3+\alpha^0x^2+\alpha^0x^1+\alpha^0x^0$. Lastly, the combining unit 23 combines the multiplication polynomial $x^6C(x)$ with the encoding modulus polynomial $p(x)$ so as to generate the output polynomial $TX(x)=\alpha^0x^{14}+\alpha^0x^{13}+\alpha^0x^{12}+\alpha^0x^{11}+\alpha^0x^{10}+\alpha^0x^9+\alpha^0x^8+\alpha^0x^7+\alpha^0x^6+\alpha^0x^5+\alpha^0x^4+\alpha^0x^3+\alpha^0x^2+\alpha^0x^1+\alpha^0$. The output signal represented by the output polynomial is (0001, 0001, 0001, 0001, 0001, 0001, 0001, 0001, 0001, 0001, 0001, 0001, 0001, 0001, 0001) with fifteen 4-bit symbols.

Figure 5:
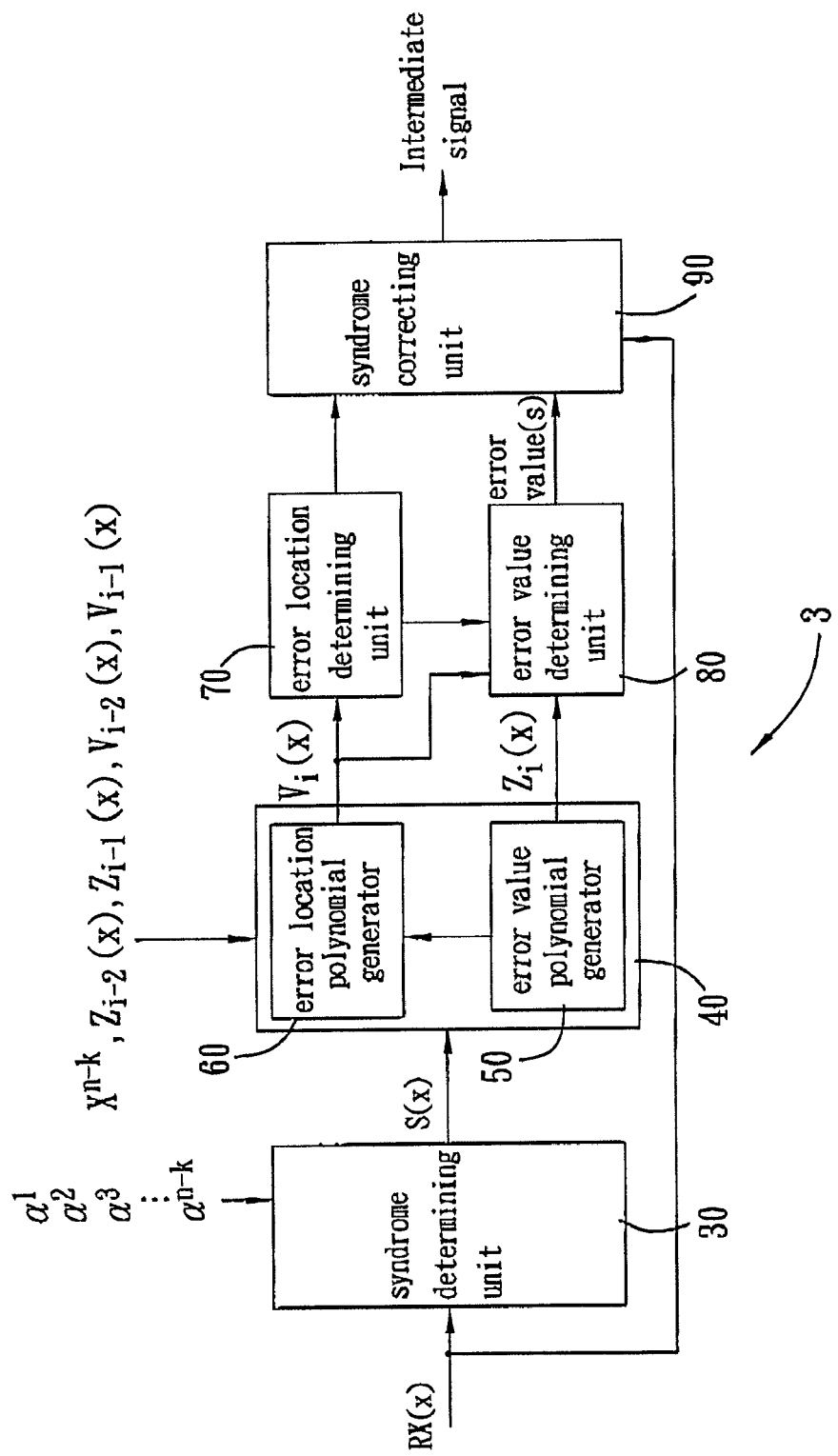
FIG. 5 is a schematic block diagram, illustrating an error correction decoding module of the decoding device according to the preferred embodiment.

With reference to FIG. 5, the error correction decoding module 3 of the decoding device 200 includes a syndrome determining unit 30, an error information determining unit 40, an error location determining unit 70, an error value determining unit 80, and a syndrome correcting unit 90.

The syndrome determining unit 30 receives the input signal which is the output signal generated by the error correction encoding module 2 as affected by noise during transmission via the transmission channel 8 (as shown in FIG. 2), and determines a syndrome polynomial $S(x)$ with reference to the (n) number of terms of an input polynomial $RX(x)$ representative of the input signal and the (n−k) number of roots $\alpha^1, \alpha^2, \ldots, \alpha^{n-k}$ of the second predetermined polynomial $g(x)$. In particular, the syndrome polynomial $S(x)$ is determined according to the following Formula 6.

$$S(x) = \sum_{m=1}^{n-k} RX(\alpha^m) \cdot x^{m-1} \quad \text{(Formula 6)}$$

Figure 6:
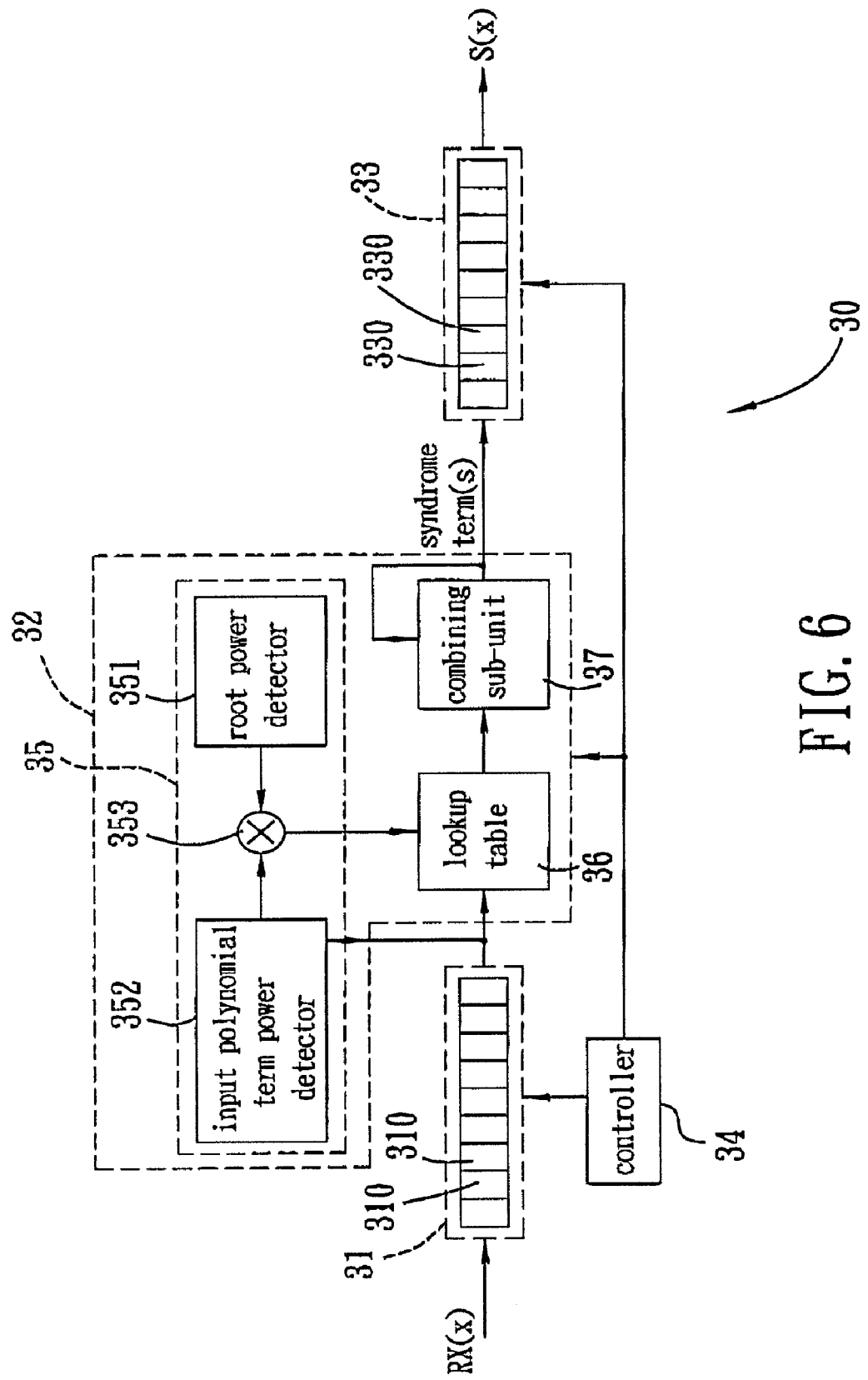
FIG. 6 is a schematic block diagram, illustrating a syndrome determining unit of the error correction decoding module according to the preferred embodiment.

With further reference to FIG. 6, in this embodiment, the syndrome determining unit 30 includes a first shift register 31, a syndrome term generator 32, a second shift register 33 and a controller 34. The first shift register 31 is coupled electrically to the controller 34, receives the input polynomial $RX(x)$, and includes (n) number of cascaded storage members 310 for respectively storing the (n) number of terms of the input polynomial $RX(x)$ under the control of the controller 34. The syndrome term generator 32 is coupled electrically to the controller 34, is further coupled electrically to the first shift register 31 for receiving the input polynomial $RX(x)$ therefrom, and generates a syndrome term for each of the (n−k) number of roots $\alpha^1, \alpha^2, \ldots, \alpha^{n-k}$ of the second predetermined polynomial $g(x)$ under the control of the controller 34. The second shift register 33 is coupled electrically to the controller 34, is further coupled electrically to the syndrome term generator 32 for receiving the syndrome terms for all of the (n−k) number of roots $\alpha^1, \alpha^2, \ldots, \alpha^{n-k}$ of the second predetermined polynomial $g(x)$ therefrom, and includes (n−k) number of cascaded storage members 330, each of which stores the syndrome term corresponding to a corresponding one of the (n−k) number of roots $\alpha^1, \alpha^2, \ldots, a^{n-k}$ under the control of the controller 34. The syndrome terms cooperate to define the syndrome polynomial $S(x)$.

Each syndrome term is generated by substituting the Corresponding one of the (n−k) number of roots $\alpha^1, \alpha^2, \ldots, \alpha^{n-k}$ of the second predetermined polynomial $g(x)$ into the input polynomial $RX(x)$, and the syndrome terms can be denoted by $RX(\alpha^1), RX(\alpha^2), \ldots, RX(\alpha^{n-k})$. In particular, the syndrome term generator 32 includes a power generator 35, a lookup table 36, and a combining sub-unit 37. The power generator 35 is coupled electrically to the first shift register 31 for receiving in sequence the (n) number of terms of the input polynomial $RX(x)$, and generates, for each of the (n) number of terms of the input polynomial $RX(x)$, a power signal corresponding to each of the (n−k) number of roots $\alpha^1, \alpha^2, \ldots,$ $\alpha^{n-k}$ of the second predetermined polynomial $g(x)$ with reference to power numbers of the corresponding one of the roots of the second predetermined polynomial $g(x)$ and the corresponding one of the terms of the input polynomial $RX(x)$. The power signal represents the power number of the corresponding term of the input polynomial $RX(x)$ as substituted by the corresponding root $\alpha^\beta$ of the second predetermined polynomial $g(x)$ and having a base a identical to that of the roots $\alpha^1, \alpha^2, \ldots, \alpha^{n-k}$ of the second predetermined polynomial $g(x)$, where $1 \leq \beta \leq (n-k)$. The lookup table 36 is coupled electrically to the first shift register 31 for receiving in sequence the (n) number of terms of the input polynomial $RX(x)$, is further coupled electrically to the power generator 35 for receiving the power signal therefrom, and outputs, for each of the (n) number of terms of the input polynomial $RX(x)$, an intermediate term signal representative of a corresponding one of the (n) number of terms of the input polynomial $RX(x)$ as substituted by a corresponding one of the (n−k) number of roots $\alpha^1, \alpha^2, \ldots, \alpha^{n-k}$ of the second predetermined polynomial $g(x)$. The combining sub-unit 37 is coupled electrically to the lookup table 36 for combining the intermediate term signals for all of the (n) number of terms of the input polynomial $RX(x)$ and corresponding to the same one of the (n−k) number of roots $\alpha^1, \alpha^2, \ldots, \alpha^{n-k}$ so as to result in the syndrome term $RX(\alpha^1), RX(\alpha^2), \ldots, RX(\alpha^{n-k})$ for the corresponding one of the (n−k) number of roots $\alpha^1, \alpha^2, \ldots, \alpha^{n-k}$ to be stored in a corresponding one of the (n−k) number of cascaded storage members 330 of the second shift register 33.

Furthermore, the power generator 35 includes a root power detector 351, an input polynomial term power detector 352 coupled electrically to the first shift register 31 for receiving in sequence the (n) number of terms of the input polynomial $RX(x)$, and a multiplier 353 coupled electrically to the root power detector 351 and the input polynomial term power detector 352. During computation of each power signal, the root power detector 351 detects the power number of the corresponding one of the roots $\alpha^1, \alpha^2, \ldots, \alpha^{n-k}$ of the second predetermined polynomial $g(x)$, the input polynomial term power detector 352 detects the power number of the corresponding one of the terms of the input polynomial $RX(x)$, and the multiplier 353 multiplies these two power numbers together so as to generate the power signal.

For purpose of illustration, the previous example is used for the following description, where the output signal represented by the output polynomial is (0001, 0001, 0001, 0001, 0001, 0001, 0001, 0001, 0001, 0001, 0001, 0001, 0001, 0001, 0001) with fifteen 4-bit symbols. Due to noise interference during transmission via the transmission channel 8 (shown in FIG. 2), the input signal received by the error correction decoding module 3 of the decoding device 200 might possibly differ from the output signal generated by the error correction encoding module 2 of the encoding device 100. In this example, it is assumed that the input signal is, from the least significant bit to the most significant bit, (0001, 0001, 0001, 0001, 0001, 1000, 0101, 0001, 0001, 0001, 0001, 0001, 0001, 1110, 0001), with fifteen 4-bit symbols, three symbols of which contain errors as compared to the output signal generated by the error correction encoding module 2 due to noise interference. The input polynomial $RX(x)$ representative of the input signal is defined as $RX(x)=\alpha^0x^{14}+\alpha^{11}x^{13}+\alpha^0x^{12}+\alpha^0x^{11}+\alpha^0x^{10}+\alpha^0x^9+\alpha^0x^8+\alpha^0x^7\alpha\alpha^8x^6+\alpha^3x^5+\alpha^0x^4+\alpha^0x^3+\alpha^0x^2+\alpha^0x^1+\alpha^0$.

The process of determining the syndrome polynomial $S(x)$ is as follows. First, the storage members 310 of the first shift register 31 respectively store the terms $\alpha^0, \alpha^{11}, \alpha^0, \alpha^0, \alpha^0, \alpha^0, \alpha^0, \alpha^0, \alpha^8, \alpha^3, \alpha^0, \alpha^0, \alpha^0, \alpha^0, \alpha^0$ of the input polynomial $RX(x)$. The syndrome term generator 32 generates in sequence the syndrome terms respectively corresponding to the (n−k) number of roots $\alpha^1, \alpha^2, \ldots, \alpha^{n-k}$ of the second predetermined polynomial g(x). In this embodiment, each syndrome term is generated in a loop with cycles equal in number to the terms of the input polynomial RX(x), where a corresponding term of the input polynomial RX(x) as substituted by the root $\alpha^\beta$ ($1 \leq \beta \leq (n-k)$) of the second predetermined polynomial g(x) corresponding to the syndrome term is computed during each cycle, and the results of all the terms of the input polynomial RX(x) as substituted by the same root $\alpha^\beta$ of the second predetermined polynomial g(x) are summed to result in the syndrome term, which is subsequently stored in the corresponding storage member 330 of the second shift register 33 upon completion of last cycle of the loop.

As mentioned previously, the second predetermined polynomial g(x) in this example has n−k=15−9=6 number of roots, namely $\alpha^1, \alpha^2, \ldots, \alpha^6$. Therefore, there are six syndrome terms in total, respectively being $RX(\alpha^1)=\alpha^0$, $RX(\alpha^2)=\alpha^5$, $RX(\alpha^3)=\alpha^4$, $RX(\alpha^4)=\alpha^{11}$, $RX(\alpha^5)=\alpha^9$, and $RX(\alpha^6)=\alpha^{13}$. These syndrome terms are respectively stored in the storage members 330 of the second shift register 33. The second shift register 33 outputs the syndrome terms when it is determined by the controller 34 that all of the roots of the second predetermined polynomial g(x) have been used for computing the syndrome terms. The syndrome terms cooperate to define the syndrome polynomial S(x), which is $S(x)=RX(\alpha^1)+RX(\alpha^2)x^1+RX(\alpha^3)x^2+RX(\alpha^4)x^3+RX(\alpha^5)x^4+RX(\alpha^6)x^5=\alpha^{13}x^5+\alpha^9x^4+\alpha^{11}x^3+\alpha^4x^2+\alpha^5x^1+\alpha^0$ in this example.

Referring back to FIG. 5, the error information determining unit 40 is coupled electrically to the syndrome determining unit 30 for receiving the syndrome polynomial S(x) therefrom, and determines an error location polynomial $V_i(x)$ and an error value polynomial $Z_i(x)$ with reference to the syndrome polynomial S(x) and a reference polynomial that is related to (n−k), which is identical to the first predetermined polynomial $x^{n-k}$ and will be denoted by the same reference numeral. In particular, the error location polynomial $V_i(x)$ and the error value polynomial $Z_i(x)$ are determined according to the Euclidean algorithm with reference to the following Formulae 7 and 12. Implementations of the same will be described in detail later.

$Z_{-1}(x)=x^{n-k}$ (Formula 7)

$Z_0(x)=S(x)$ (Formula 8)

$V_{-1}(x)=0$ (Formula 9)

$V_0(x)=1$ (Formula 10)

$Z_{i-2}(x)=q_i(x) \cdot Z_{i-1}(x)+Z_i(x)$ (Formula 11)

$V_i(x)=V_{i-2}(x)-q_i(x) \cdot V_{i-1}(x)$ (Formula 12)

Figure 7:
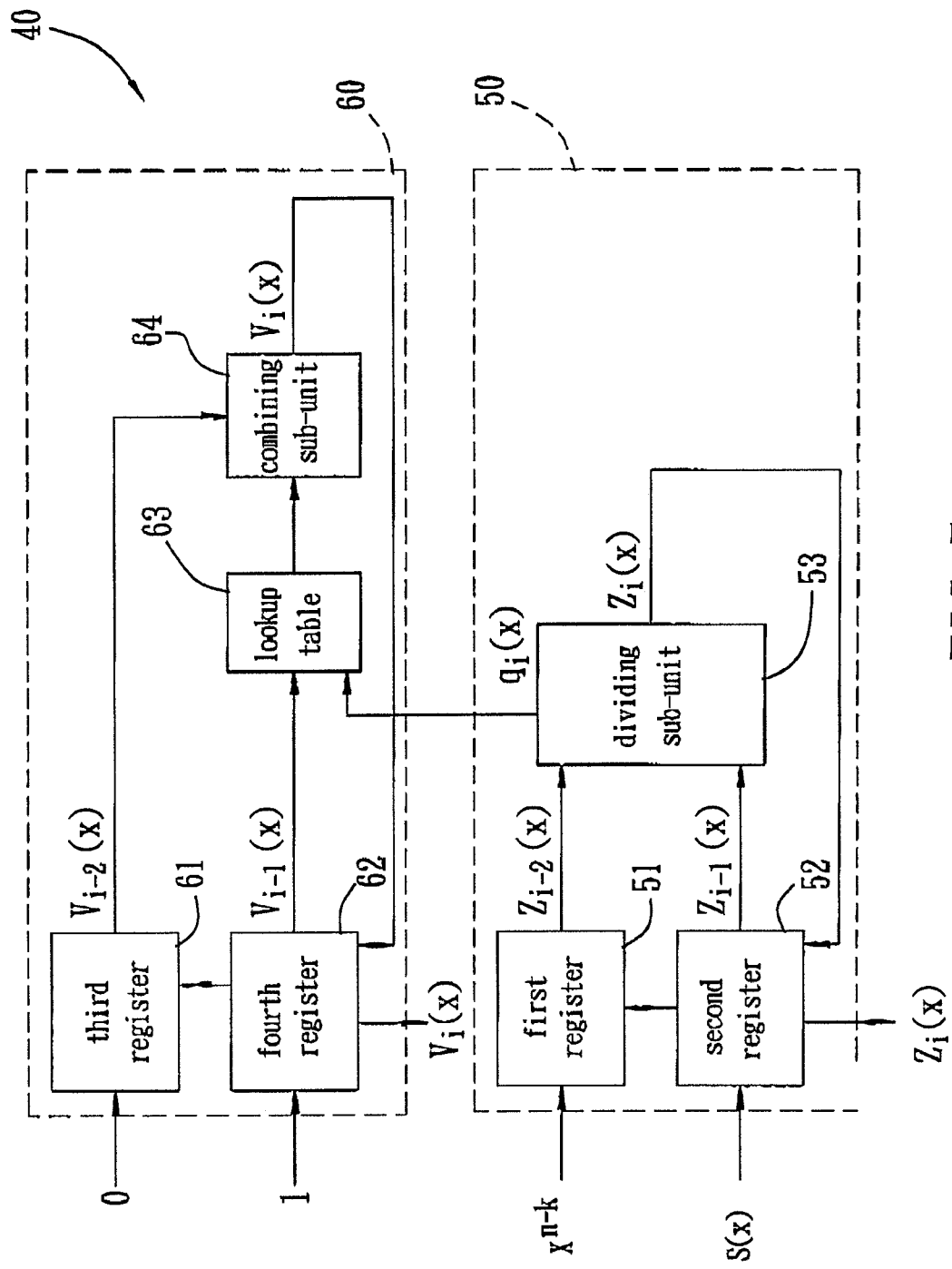
FIG. 7 is a schematic block diagram, illustrating an error information determining unit of the error correction decoding module according to the preferred embodiment.

With further reference to FIG. 7, the error information determining unit 40 includes an error value polynomial generator 50 that includes a first register 51, a second register 52 and a dividing sub-unit 53. The dividing sub-unit 53 is coupled electrically to the first and second registers 51, 52 for determining a remainder of a first polynomial $Z_{i-2}(x)$ stored in the first register 51 divided by a second polynomial $Z_{i-1}(x)$ stored in the second register 52 so as to generate a location modulus polynomial $Z_i(x)$.

The first register 51 initially stores the reference polynomial $x^{n-k}$ as the first polynomial $Z_{i-2}(x)$, and is coupled electrically to the second register 52 for updating the first polynomial $Z_{i-2}(x)$ with the second polynomial $Z_{i-1}(x)$.

The second register 52 is coupled electrically to the syndrome determining unit 30 for receiving and initially storing the syndrome polynomial S(x) as the second polynomial $Z_{i-1}(x)$, and is coupled electrically to the dividing sub-unit 53 for updating the second polynomial $Z_{i-1}(x)$ with the location modulus polynomial $Z_i(x)$. The second polynomial $Z_{i-1}(x)$ is outputted as the error value polynomial $Z_i(x)$ when an order of the second polynomial $Z_{i-1}(x)$ is smaller than (n−k)/2.

The dividing sub-unit 53 further determines a quotient of the first polynomial $Z_{i-2}(x)$ divided by the second polynomial $Z_{i-1}(x)$ so as to generate a location quotient polynomial $q_i(x)$. The error information determining unit 40 further includes an error location polynomial generator 60 that includes a third register 61, a fourth register 62, a lookup table 63, and a combining sub-unit 64. The combining sub-unit combines a third polynomial $V_{i-2}(x)$ stored in the third register 61 with a location multiple polynomial so as to result in a sum polynomial $V_i(x)$.

The lookup table 63 is coupled electrically to the dividing sub-unit 53 of the error value polynomial generator 50 for receiving the location quotient polynomial $q_i(x)$ therefrom, generates the location multiple polynomial that is representative of the product of a fourth polynomial $V_{i-1}(x)$ stored in the fourth register 62 and the location quotient polynomial $q_i(x)$ and that is to be outputted to the combining sub-unit 64. In other words, the location multiple polynomial is denoted by $q_i(x) \cdot V_{i-1}(x)$. The third register 61 initially stores zero as the third polynomial $V_{i-2}(x)$, and is coupled electrically to the fourth register 62 for updating the third polynomial $V_{i-2}(x)$ with the fourth polynomial $V_{i-1}(x)$.

The fourth register 62 initially stores one as the fourth polynomial $V_{i-1}(x)$, and is coupled electrically to the combining sub-unit 69 for updating the fourth polynomial $V_{i-1}(x)$ with the sum polynomial V(x). The fourth polynomial $V_{i-1}(x)$ is outputted as the error location polynomial $V_i(x)$ when an order of the fourth polynomial is smaller than (n−k)/2.

Continuing with the previous example, where the syndrome polynomial S(x) is $S(x)=\alpha^{13}x^5+\alpha^9x^4+\alpha^{11}x^3+\alpha^4x^2+\alpha^5x^1+\alpha^0$. The process of determining the error location polynomial $V_i(x)$ and the error value polynomial $Z_i(x)$ according to the preferred embodiment of the present invention is tabulated in Table 2.

TABLE 2

| i | $V_i(x)$ | $Z_i(x)$ | $q_i(x)$ |
|---|---|---|---|
| −1 | 0 | $x^{n-k} = x^6$ | — |
| 0 | 1 | $S(x) = \alpha^{13}x^5 + \alpha^9x^4 + \alpha^{11}x^3 + \alpha^4x^2 + \alpha^5x^1 + \alpha^0$ | — |
| 1 | $\alpha^2x^1 + \alpha^{13}$ | $\alpha^5x^4 + \alpha^5x^3 + \alpha^6x^2 + \alpha^{12}x^1 + \alpha^{13}$ | $\alpha^2x^1 + \alpha^{13}$ |
| 2 | $\alpha^{10}x^2 + \alpha^{10}x^1 + \alpha^{14}$ | $\alpha^{12}x^3 + \alpha^{11}x^2 + \alpha^2x^1 + \alpha^{14}$ | $\alpha^8x^1 + \alpha^5$ |
| 3 | $\alpha^3x^3 + \alpha^2x^2 + \alpha^4x^1 + \alpha^9$ | $\alpha^4x^2 + \alpha^9x^1 + \alpha^9$ | $\alpha^8x^1 + \alpha^{11}$ |

With reference back to FIG. 5, the error location determining unit 70 is coupled electrically to the error information determining unit 40 for receiving the error location polynomial $V_i(x)$ therefrom, and determines at least one error location representative of a corresponding one of the (n) number of terms of the input polynomial RX(x).

Figure 8:
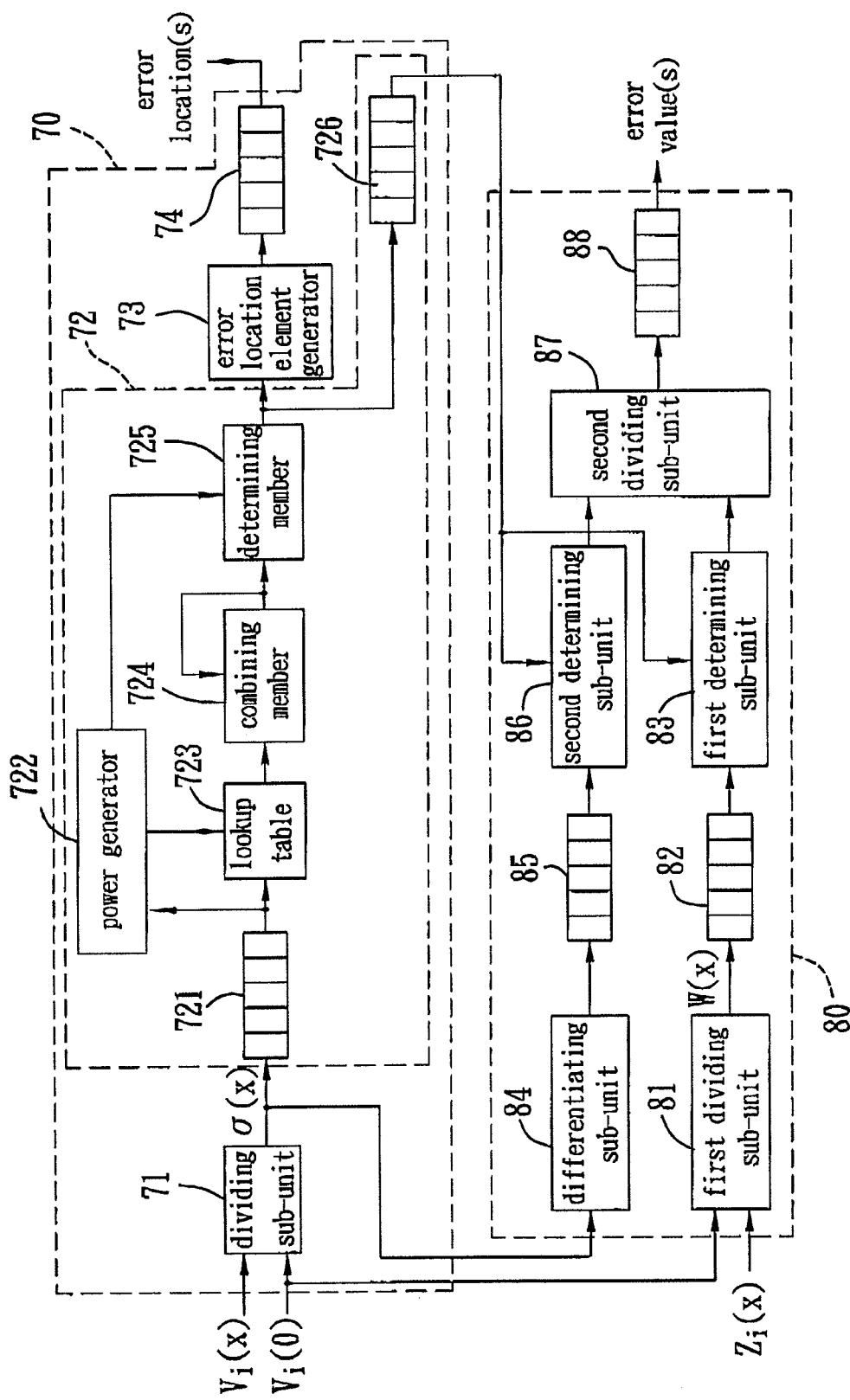
FIG. 8 is a schematic block diagram, illustrating an error location determining unit and an error value determining unit of the error correction decoding module according to the preferred embodiment.

With further reference to FIG. 8, the error location determining unit 70 determines the at least one error location by determining whether a corresponding one of (n) number of nonzero elements $\alpha^0, \alpha^1, \alpha^2, \ldots, \alpha^{n-t}$ of the finite field $GF(2^m)$ is a root of the error location polynomial $V_i(x)$. The error location determining unit 70 includes a dividing sub-unit 71 and a root determining sub-unit 72. The dividing sub-unit 71 is coupled electrically to the error information determining unit 40 for receiving the error location polynomial $V_i(x)$ therefrom, and for performing a division of the error location polynomial $V_i(x)$ by a constant term $V_i(0)$ of the error location polynomial $V_i(x)$ so as to generate a location intermediate polynomial $\sigma(x)$. In other words, the location intermediate polynomial $\sigma(x)$ is equal to $$\frac{V_i(x)}{V_i(0)}.$$

The root determining sub-unit 72 is coupled electrically to the dividing sub-unit 71 for receiving the location intermediate polynomial $\sigma(x)$ therefrom, and generates a test result for each of the (n) number of nonzero elements $\alpha^0, \alpha^1, \alpha^2, \ldots \alpha^{n-1}$ of the finite field $GF(2^m)$ by substituting a corresponding one of the (n) number of nonzero elements $\alpha^0, \alpha^1, \alpha^2, \ldots, \alpha^{n-1}$ into the location intermediate polynomial $\sigma(x)$. In other words, the test result is $\sigma(\alpha^\beta)$ where $0 \leq \beta \leq (n-1)$. The root determining sub-unit 72 outputs the corresponding nonzero element $\alpha^\beta$ as a corresponding error location reversal element when the test result $\sigma(\alpha^\beta)$ is zero. The error location reversal element is representative of a corresponding one of the at least one error location.

In this embodiment, the error location determining unit 70 further includes an error location element generator 73 coupled electrically to the root determining sub-unit 72 for receiving the error location reversal element therefrom. The error location element generator 73 generates an error location element representative of the corresponding one of the at least one error location such that power numbers of the error location element and the error location reversal element have a sum of (n).

The root determining sub-unit 72 includes a first shift register 721, a power generator 722, a lookup table 723, a combining member 724, a determining member 725, and a second shift register 726.

The first shift register 721 is coupled electrically to the dividing unit 71 for receiving the location intermediate polynomial $\sigma(x)$ therefrom, and includes a plurality of cascaded storage members for respectively storing a plurality of terms of the location intermediate polynomial $\sigma(x)$.

The power generator 722 is coupled electrically to the first shift register 721 for receiving in sequence the terms of the location intermediate polynomial $\sigma(x)$, and generates, for each of the terms of the location intermediate polynomial $\sigma(x)$, a power signal corresponding to each of the nonzero elements $\alpha^0, \alpha^1, \alpha^2, \ldots, \alpha^{n-1}$ of the finite field $GF(2^m)$ with reference to power numbers of the corresponding one of the nonzero elements $\alpha^0, \alpha^1, \alpha^2, \ldots \alpha^{n-1}$ of the finite field $GF(2^m)$ and the corresponding one of the terms of the location intermediate polynomial $\sigma(x)$. The power signal represents the power number of the corresponding term of the location intermediate polynomial $\sigma(x)$ as substituted by the corresponding nonzero element $\alpha^\beta$ of the finite field $GF(2^m)$ and having a base a identical to that of the nonzero elements $\alpha^0, \alpha^1, \alpha^2, \ldots, \alpha^{n-1}$ of the finite field $GF(2^m)$, where $0 \leq \beta \leq (n-1)$. Since operation of the power generator 722 of the root determining sub-unit 72 is similar to that of the power generator 35 of the syndrome determining unit 30, further details of the same are omitted herein for the sake of brevity.

The lookup table 723 is coupled electrically to the first shift register 721 for receiving in sequence the terms of the location intermediate polynomial $\sigma(x)$. The lookup table 723 is further coupled electrically to the power generator 722 for receiving the power signal therefrom, and outputs, for each of the terms of the location intermediate polynomial $\sigma(x)$, an intermediate term signal representative of a corresponding one of the terms of the location intermediate polynomial $\sigma(x)$ as substituted by a corresponding one of the (n) number of nonzero elements $\alpha^0, \alpha^1, \alpha^2, \ldots, \alpha^{n-1}$ of the finite field $GF(2^m)$.

The combining member 724 is coupled electrically to the lookup table 723 for combining the intermediate term signals for all of the terms of the location intermediate polynomial $\sigma(x)$ and corresponding to the same one of the (n) number of nonzero elements $\alpha^0, \alpha^1, \alpha^2, \ldots, \alpha^{n-1}$ so as to result in the test result for the corresponding one of the (n) number of nonzero elements $\alpha^0, \alpha^1, \alpha^2, \ldots, \alpha^{n-1}$.

The determining member 725 is coupled electrically to the combining member 724 for receiving the test result therefrom, and determines whether the test result is zero. The determining member 725 outputs the nonzero element $\alpha^\beta$ corresponding to the test result as a corresponding error location reversal element upon determining that the test result $\sigma(\alpha^\beta)$ is zero.

The second shift register 726 is coupled electrically to the determining member 725 for receiving the error location reversal element (s) therefrom, and includes a plurality of cascaded storage members for respectively storing the error location reversal element (s).

The error location determining unit 70 further includes a third shift register 74 coupled electrically to the error location element generator 73 for receiving the error location element (s) therefrom, and includes a plurality of cascaded storage members for respectively storing the error location element (s).

Continuing with the previous example, where the error location polynomial $V_1(x)$ is $V_1(x) = \alpha^3 x^3 + \alpha^2 x^2 + \alpha^4 x^1 + \alpha^9$. The dividing sub-unit 71 computes the location intermediate polynomial $\sigma(x)$ to be $$\frac{V_i(x)}{V_i(0)} = \frac{\alpha^3 x^3 + \alpha^2 x^2 + \alpha^4 x^1 + \alpha^9}{\alpha^9} =$$
$$= \alpha^9 x^3 + \alpha^8 x^2 + \alpha^{10} x^1 + \alpha^0.$$

The storage members of the first shift register 721 respectively store the terms $\alpha^3, \alpha^2, \alpha^4, \alpha^9$ of the location intermediate polynomial $\sigma(x)$. The power generator 722, the lookup table 723, and the combining member 724 cooperate to generate in sequence the test results respectively corresponding to the (n) number of nonzero elements $\alpha^0, \alpha^1, \alpha^2, \ldots, \alpha^{n-1}$ of the finite field $GF(2^m)$. In this embodiment, each test result is generated in a loop with cycles equal in number to the terms of the location intermediate polynomial $\sigma(x)$, where a corresponding term of the location intermediate polynomial $\sigma(x)$ as substituted by the nonzero element $\alpha^\beta (0 \leq \beta \leq (n-1))$ of the finite field $GF(2^m)$ corresponding to the test result is computed during each cycle, and the results of all the terms of the location intermediate polynomial $\sigma(x)$ as substituted by the same nonzero element $\alpha^\beta$ of the finite field $GF(2^m)$ are summed to generate the test result, which is subsequently outputted to the determining member 725 upon completion of the last cycle of the loop.

As mentioned previously, the finite field $GF(2^m)$ in this example is $GF(2^4)$, which has $2^m=2^{14}=16$ number of elements, namely $0, \alpha^0, \alpha^1, \alpha_2, \ldots, \alpha^{14}$, with $\alpha^0, \alpha^1, \alpha^2, \ldots, \alpha^{14}$ being the nonzero elements. Therefore, there are fifteen test results in total, respectively being $\sigma(\alpha^0)=\alpha^{14}$, $\sigma(\alpha^1)=\alpha^{10}$, $\sigma(\alpha^2)=0$, $\sigma(\alpha^3)=\alpha^{13}$, $\sigma(\alpha^4)=\alpha^5$, $\sigma(\alpha^5)=\alpha^1$, $\sigma(\alpha^6)=\alpha^9$, $\sigma(\alpha^7)=\alpha^{12}$, $\sigma(\alpha^8)=\alpha^7$, $\sigma(\alpha^9)=0$, $\sigma(\alpha^{10})=0$, $\sigma(\alpha^{11})=\alpha^4$, $\sigma(\alpha^{12})=\alpha^{12}$, $\sigma(\alpha^{13})=\alpha^{12}$, and $\sigma(\alpha^{14})=\alpha^7$. These test results are outputted to the determining member 725 in sequence, which determines that the test results $\sigma(\alpha^2)$, $\sigma(\alpha^9)$ and $\sigma(\alpha^{10})$ are zero, and outputs the corresponding nonzero elements $\alpha^2$, $\alpha^9$ and $a^{10}$ as the error location reversal elements to be stored in the second shift register 726. The error location element generator 73 receives the error location reversal elements $\alpha^2$, $\alpha^9$ and $\alpha^{10}$ from the determining member 725, and generates the corresponding error location elements by subtracting the power numbers of the error location reversal elements $\alpha^2$, $\alpha^9$ and $\alpha^{10}$ from $n=2^n-1=15$. In this example, the error location elements include $\alpha^{13}$, $\alpha^6$ and $\alpha^5$.

With reference to FIG. 8, the error value determining unit 80 is coupled electrically to the error information determining unit 40 for receiving the error value polynomial $Z_i(x)$ and the error location polynomial $V_i(x)$ therefrom, is further coupled electrically to the error location determining unit 70 for receiving the at least one error location therefrom, and determines an error value for each of the at least one error location with reference to the error value polynomial $Z_i(x)$, the error location polynomial $V_i(x)$, and a corresponding one of the at least one error location.

The error value determining unit 80 includes a first dividing sub-unit 81, a first shift register 82, a first determining sub-unit 83, a differentiating sub-unit 84, a second shift register 85, a second determining sub-unit 86, a second dividing sub-unit 87, and a third shift register 88.

The first dividing sub-unit 81 is coupled electrically to the error information determining unit 40 for respectively receiving the error value polynomial $Z_i(x)$ and the error location polynomial $V_i(x)$ therefrom, and performs division of the error value polynomial $Z_i(x)$ by the constant term $V_i(0)$ of the error location polynomial $V_i(x)$ so as to generate an error quotient polynomial $W(x)$. In other words, the error quotient polynomial $W(x)$ is equal to $$\frac{Z_i(x)}{V_i(0)}.$$

The first shift register 82 is coupled electrically to the first dividing sub-unit 81 for receiving the error quotient polynomial $W(x)$ therefrom, and includes a plurality of cascaded storage members for respectively storing a plurality of terms of the error quotient polynomial $W(x)$.

The first determining sub-unit 83 is coupled electrically to the first shift register 82 and the second shift register 726 of the root determining sub-unit 72 for respectively receiving the error quotient polynomial $W(x)$ and the error location reversal element(s) therefrom, and generates, for each error location reversal element, a first result by substituting the error location reversal element into the error quotient polynomial $W(x)$. Since operation of the first determining sub-unit 83 is similar to that of the syndrome term generator 32, further details of the same are omitted herein for the sake of brevity.

The differentiating sub-unit 84 is coupled electrically to the dividing sub-unit 71 of the error location determining unit 70 for receiving the location intermediate polynomial $\sigma(x)$ therefrom, and generates a differential polynomial of the location intermediate polynomial, i.e., $\sigma'(x)$. In this embodiment, the differentiating sub-unit 84 is a binary shifter.

The second shift register 85 is coupled electrically to the differentiating sub-unit 84 for receiving the differential polynomial $\sigma'(x)$ therefrom, and includes a plurality of cascaded storage members for respectively storing a plurality of terms of the differential polynomial $\sigma'(x)$.

The second determining sub-unit 86 is coupled electrically to the second shift register 85 and the second shift register 726 of the root determining sub-unit 72 for respectively receiving the differential polynomial $\sigma'(x)$ and the error location reversal element(s) therefrom, and generates a second result, for each error location reversal element, by substituting the error location reversal element into the differential polynomial $\sigma'(x)$. Since operation of the second determining sub-unit 86 is similar to that of the syndrome term generator 32, further details of the same are omitted herein for the sake of brevity.

The second dividing sub-unit 87 is coupled electrically to the first and second determining sub-units 83, 86 for receiving the first and second results therefrom, and performs division of the first result by the second result so as to generate the error value for the error location representative of the corresponding error location reversal element.

Continuing with the previous example, where the error value polynomial $Z_i(x)$ is $Z_i(x)=\alpha^4 x^2+\alpha^9 x^1+\alpha^9$ and the location intermediate polynomial $\sigma(x)$ is $\sigma(x)=\alpha^9 x^3+\alpha^8 x^2+\alpha^{10}x^1+\alpha^0$.

The first dividing sub-unit 81 computes the error quotient polynomial $W(x)$ to be $$\frac{Z_i(x)}{V_i(0)} = \frac{\alpha^4 x^2+\alpha^9 x^1+\alpha^9}{\alpha^9} = \alpha^{10}x^2 \alpha^0 x^1+\alpha^0.$$

The storage members of the first shift register 82 respectively store the terms $\alpha^{10}$, $\alpha^0$, $\alpha^0$ of the error quotient polynomial $W(x)$. The differentiating sub-unit 84 computes the differential polynomial $\sigma'(x)$ to be $3\alpha^9 x^2+2\alpha^8 x^1+\alpha^{10}$. The storage members of the second shift register 85 respectively store the terms $3\alpha^9$, $2\alpha^8$, $\alpha^{10}$ of the differential polynomial $\sigma'(x)$. For each of the error location reversal elements, which include $\alpha^2$, $\alpha^9$ and $\alpha^{10}$ in this example, the first determining sub-unit 83 generates the corresponding first result, and the second determining sub-unit 86 generates the corresponding second result. The first results corresponding to the error location reversal elements $\alpha^2$, $\alpha^9$, $\alpha^{10}$ are respectively $W(\alpha^2)=\alpha^{14}+\alpha^2+\alpha^0$, $W(\alpha^9)=\alpha^{13}+\alpha^9+\alpha^0$, and $W(\alpha^{10})=\alpha^0+\alpha^{10}+\alpha^0$. The second results corresponding to the error location reversal elements $\alpha^2$, $\alpha^9$, $\alpha^{10}$ are respectively $\sigma'(\alpha^2)=\alpha^{13}+\alpha^{10}$, $\sigma'(\alpha^9)=\alpha^{12}+\alpha^{10}$, and $\sigma'(\alpha^{10})=\alpha^{14}+\alpha^{10}$. Upon receiving the first and second results corresponding to the same error location reversal element, the second dividing sub-unit 87 generates the corresponding error value by dividing the first result by the second result. In this example, the error value corresponding to error location reversal element $\alpha^2$ is $$\frac{W(\alpha^2)}{\sigma'(\alpha^2)} = \frac{\alpha^{14}+\alpha^2+\alpha^0}{\alpha^{13}+\alpha^{10}} = \alpha^{12},$$

the error value corresponding to the error location reversal element $\alpha^9$ is $$\frac{W(\alpha^9)}{\sigma'(\alpha^9)} = \frac{\alpha^{13} + \alpha^9 + \alpha^0}{\alpha^{12} + \alpha^{10}} = \alpha^2,$$

and the error value corresponding to the error location reversal element $a^{10}$ is $$\frac{W(\alpha^{10})}{\sigma'(\alpha^{10})} = \frac{\alpha^0 + \alpha^{10} + \alpha^0}{\alpha^{14} + \alpha^{10}} = \alpha^{14}.$$

These error values are respectively stored in the storage elements of the third shift register 88.

With reference back to FIG. 5, the syndrome correcting unit 90 receives the input signal, and is coupled electrically to the error location determining unit 70 and the error value determining unit 80 for respectively receiving the at least one error location and the error value for each of the at least one error location. The syndrome correcting unit 90 determines the recovery signal with reference to the input signal, the at least one error location, and the error value for each of the at least one error location.

Figure 9:
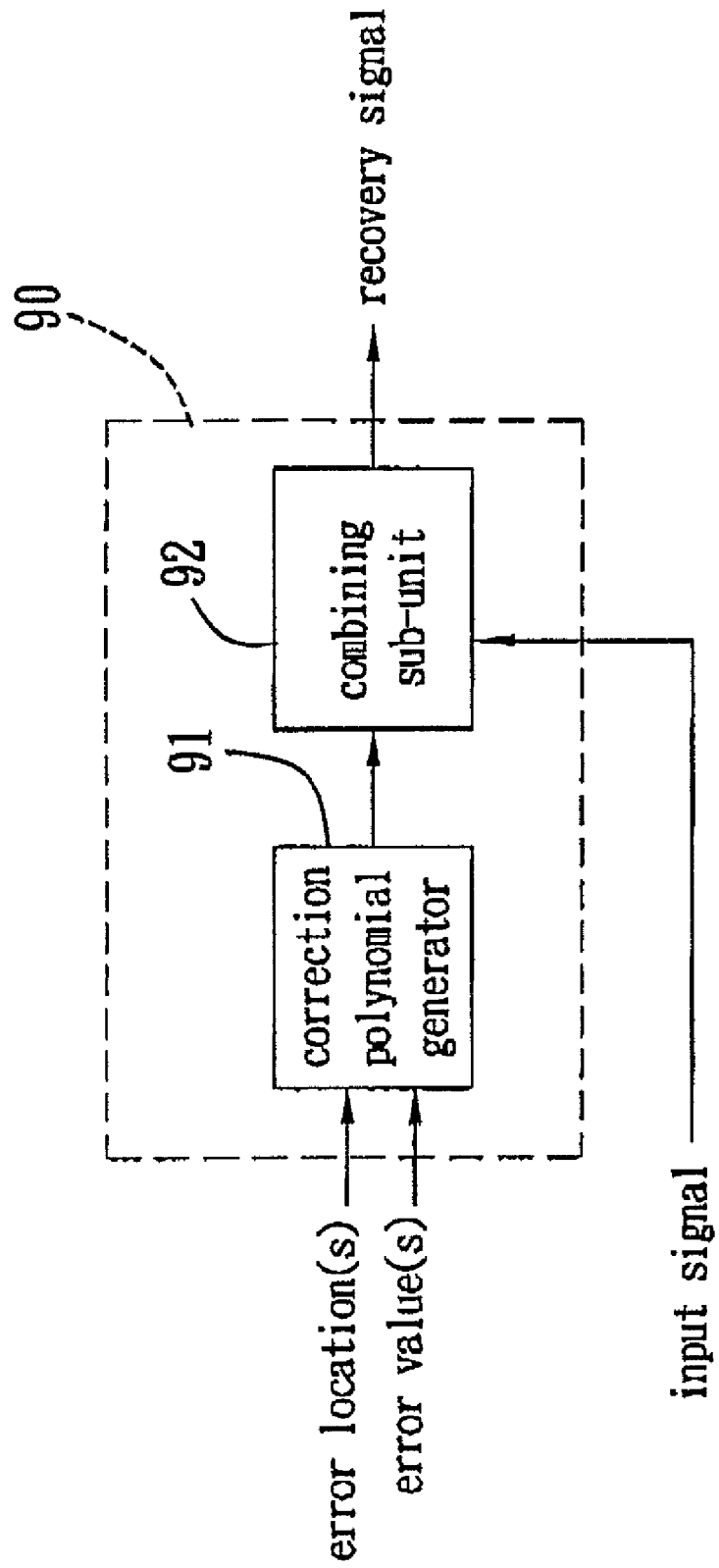
FIG. 9 is a schematic block diagram, illustrating a syndrome correcting unit of the error correction decoding module according to the preferred embodiment.

With further reference to FIG. 9, the syndrome correcting unit 90 includes a correction polynomial generator 91 and a combining sub-unit 92. The correction polynomial generator 91 is coupled electrically to the error location determining unit 70 and the error value determining unit 80 for respectively receiving the at least one error location and the error value therefrom, and outputs the error value as controlled in time by the at least one error location so as to generate a correction polynomial R(x). The combining sub-unit 92 is coupled electrically to the correction polynomial generator 91 for receiving the correction polynomial R(x) therefrom, further receives the input signal represented by the input polynomial RX(x), and combines the correction polynomial R(x) and the input polynomial RX(x) so as to result in a recovery polynomial B(x) representative of the recovery signal. In other words, the recovery polynomial B(x) is equal to B(x)=R(x)+RX(x).

The previous example is used for illustrating operation of the syndrome correcting unit 90, where the error values corresponding to the error location reversal elements $\alpha^2, \alpha^9, \alpha^{10}$ are $\alpha^{12}, \alpha^2$ and $\alpha^{14}$, and the error location reversal elements $\alpha^2, \alpha^9, \alpha^{10}$ correspond respectively to the error location elements $\alpha^{13}, \alpha^6$ and $\alpha^5$, and are representative of the corresponding error locations. The correction polynomial generator 91 generates the correction polynomial R(x) to be $R(x)=\alpha^{14}x^5+\alpha^2x^6+\alpha^{12}x^{13}$. The combining sub-unit 92 combines the correction polynomial R(x) with the input polynomial $RX(x)=\alpha^0x^{14}+\alpha^{11}x^{13}+\alpha^0x^{12}+\alpha^0x^{11}+\alpha^0x^{10}+\alpha^0x^9+\alpha^0x^8+\alpha^0x^7+\alpha^8x^6+\alpha^3x^5+\alpha^0x^4+\alpha^0x^3+\alpha^0x^2\alpha^0x^1+\alpha^0$ so as to result in the recovery polynomial B(x) that is equal to $B(x)=\alpha^0x^{14}+\alpha^0x^{13}+\alpha^0x^{12}+\alpha^0x^{11}+\alpha^0x^{10}+\alpha^0x^9+\alpha^0x^8+\alpha^0x^7+\alpha^0x^6+\alpha^0x^5+\alpha^0x^4+\alpha^0x^3+\alpha^0x^2+\alpha^0x^1+\alpha^0$. Therefore, the recovery signal has the terms in binary format of (0000, 0000, 0000, 0000, 0000, 0000, 0000, 0000, 0000, 0000, 0000, 0000, 0000, 0000, 0000) from the least significant symbol to the most significant symbol.

Figure 10:
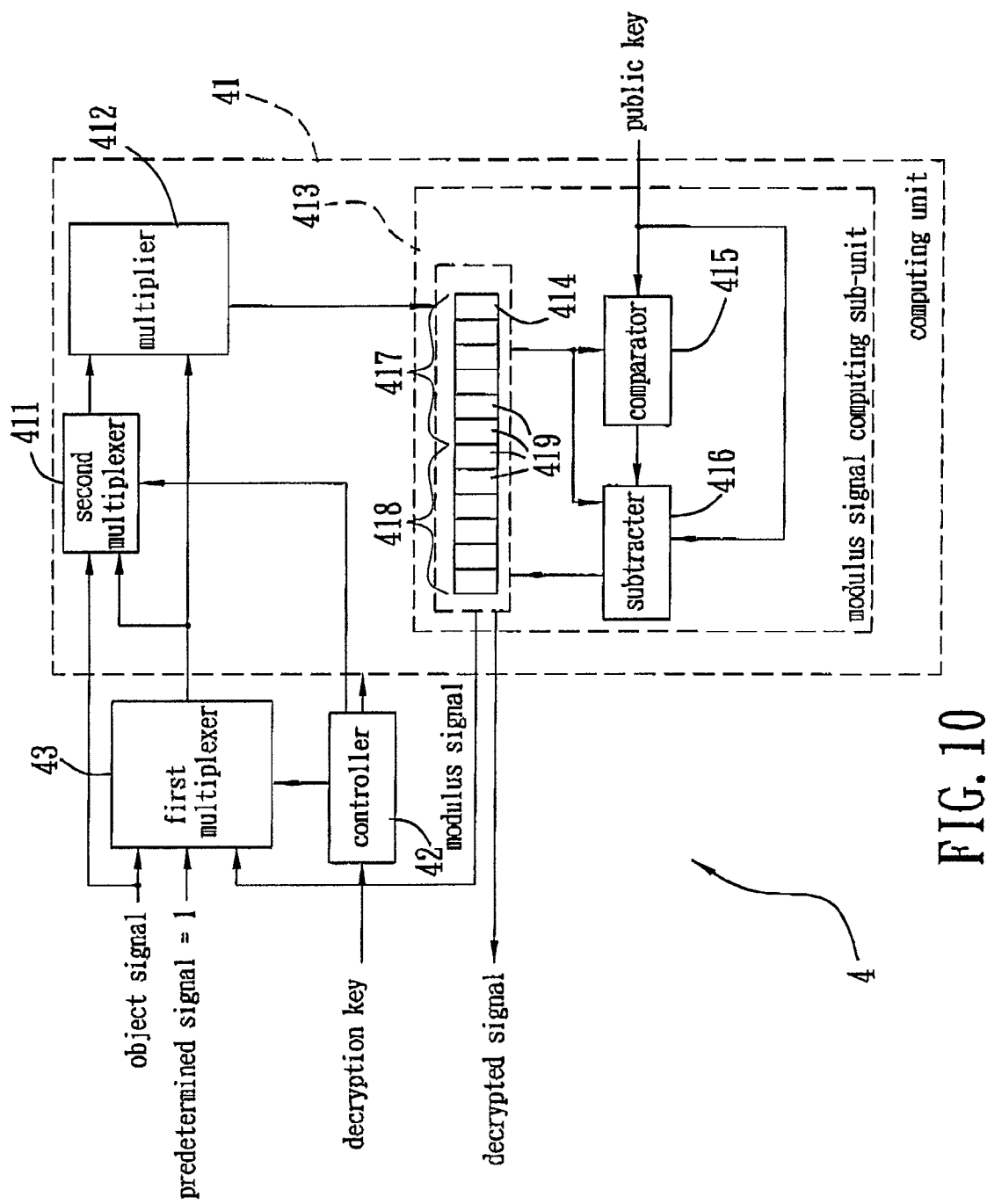
FIG. 10 is a schematic block diagram, illustrating a decrypting module of the decoding device according to the preferred embodiment.

With reference to FIG. 10, the decrypting module 4 of the decoding device 200 decrypts the portion of the recovery signal into the decrypted signal according to an h-bit decryption key (d), where (h) is not smaller than one, i.e., h≧1. The decrypting module 4 is adapted for receiving the (h) number of bits ($d_{h-1}, d_{h-2}, \ldots, d_1, d_0$) of the decryption key (d) in sequence from a most significant bit ($d_{h-1}$) to a least significant bit ($d_0$), and decrypts the portion of the recovery signal into the decrypted signal according to the abovementioned public key (N) and the decryption key (d) thus received. In particular, the portion of the recovery signal includes the (k) number of symbols starting from the (n–k)$^{th}$ symbol to the (n)$^{th}$ symbol (most significant symbol). The decrypted signal is generated according to the following Formula 13.

$$D=B^4 \bmod N \qquad \text{(Formula 13)}$$

where "mod" denotes the mathematical operation of finding a remainder after a division operation, (D) denotes a modulus signal, and (B) denotes the portion of the recovery signal, which is hereinafter referred to as the "object signal". Using the previous example, where the recovery signal is (0000, 0000, 0000, 0000, 0000, 0000, 0000, 0000, 0000, 0000, 0000, 0000, 0000, 0000, 0000) with fifteen 4-bit symbols, the object signal would be the last nine symbols of the recovery signal, and is therefore (0000, 0000, 0000, 0000, 0000, 0000, 0000, 0000, 0000).

The decrypting module 4 includes a computing unit 41, a controller 42, and a first multiplexer 43. The computing unit 41 is adapted for receiving the object signal, the public key (N), and a multiplexer output signal. The controller 42 is coupled electrically to the computing unit 41, and is adapted for receiving the bits ($d_{h-1}, d_{h-2}, \ldots, d_1, d_0$) of the decryption key (d) in sequence from the most significant bit ($d_{h-1}$) to the least significant bit ($d_0$). The first multiplexer 43 is coupled electrically to the controller 42 and the computing unit 41, is adapted for receiving the object signal and the modulus signal, and is controlled by the controller 42 to output the multiplexer output signal.

For each bit received by the controller 42 and determined by the controller 42 to be a bit other than the most significant bit ($d_{h-1}$), the controller 42 controls the computing unit 41 to perform modulus computation processing for generating the modulus signal with reference to the object signal, the public key (N), and the multiplexer output signal. To carry out decryption according to Formula 13, the modulus computation processing is computed according to at least one of the following Formulae 14 and 15:

$$D=D\times D \bmod N \qquad \text{(Formula 14)}$$

$$D=D\times B \bmod N \qquad \text{(Formula 15)}$$

where (D) represents the modulus signal, and (B) represents the object signal.

When the bit received is a second most significant bit ($d_{h-2}$) of the decryption key (d), the controller 42 controls the first multiplexer 43 to output one of the object signal and a predetermined signal as the multiplexer output signal according to a value of the most significant bit ($d_{h-1}$) of the decryption key (d), and controls the computing unit 41 to perform the modulus computation processing according to a first modulus computation for generating the modulus signal with reference to the multiplexer output signal and the public key (N). The predetermined signal is a signal representing "binary 1" in this embodiment. The first modulus computation is conducted according to the abovementioned Formula 14.

When the bit received is the second most significant bit ($d_{h-2}$) and when a value of the second most significant bit ($d_{h-1}$) matches a predetermined value, which is "binary 1" in this embodiment, the controller 42 further controls the first multiplexer 43 to output the modulus signal generated according to the first modulus computation as the multiplexer output signal, and further controls the computing unit 41 to perform the modulus computation processing according to a second modulus computation for generating the modulus signal with reference to the object signal, the public key (N), and the multiplexer output signal. The second modulus computation is conducted according to the abovementioned Formula 15.

When the bit received is a bit other than the most significant bit ($d_{h-1}$) and the second most significant bit ($d_{h-2}$) of the decryption key (d), the controller 42 controls the first multiplexer 43 to output the modulus signal as the multiplexer output signal, controls the computing unit 41 to perform the modulus computation processing according to the first modulus computation with reference to the multiplexer output signal and the public key (N), and further controls the computing unit 41 to perform the modulus computation processing according to the second modulus computation for generating the modulus signal with reference to the object signal, the public key (N), and the multiplexer output signal when a value of the bit matches the predetermined value and after the modulus computation processing according to the first modulus computation is completed.

Upon determining that the bit received is the least significant bit ($d_0$) of the decryption key (d), the controller 42 enables the computing unit 41 to output the modulus signal as the decrypted signal upon completion of the modulus computation processing according to the first modulus computation when a value of the least significant bit ($d_0$) does not match the predetermined value, and upon completion of the modulus computation processing according to the second modulus computation when the value of the least significant bit ($d_0$) matches the predetermined value.

For purpose of illustration, it is assumed that the object signal is decimal "27", the encryption key (e) is binary "1011", and the public key (N) is decimal "35". The process of decrypting the object signal into the decrypted signal according to the preferred embodiment of the present invention is tabulated in Table 3.

TABLE 3

| Bit of the Decrypted Key (d) | Formula | Value of (D) |
|---|---|---|
| $e_3 = 1$ | D = B | 27 |
| $e_2 = 0$ | D = D × D mod N | 27 × 27 mod 35 = 29 |
| $e_1 = 1$ | D = D × D mod N | 29 × 29 mod 35 = 1 |
|  | D = D × B mod N | 1 × 27 mod 35 = 27 |
| $e_0 = 1$ | D = D × D mod N | 27 × 27 mod 35 = 29 |
|  | D = D × B mod N | 29 × 27 mod 35 = 13 |

Result: the decrypted signal is decimal "13"

In this embodiment, the computing unit 41 includes a second multiplexer 411, a multiplier 412, and a modulus signal computing sub-unit 413.

The second multiplexer 411 is adapted for receiving the object signal, is coupled electrically to the first multiplexer 43 for receiving the multiplexer output signal therefrom, and is further coupled electrically to the controller 42. The second multiplexer 411 is controlled by the controller 42 to output the multiplexer output signal as a multiplier input signal during the first modulus computation, and to output the object signal as the multiplier input signal during the second modulus computation.

The multiplier 412 is coupled electrically to the first and second multiplexers 43, 411 for respectively receiving the multiplexer output signal and the multiplier input signal therefrom, and provides a multiplier output corresponding to a product of the multiplexer output signal and the multiplier input signal.

The modulus signal computing sub-unit 413 is coupled electrically to the multiplier 412 for receiving the multiplier output therefrom, and computes the modulus signal with reference to the multiplier output thus received and the public key (N) In this embodiment, the modulus signal computing sub-unit 413 includes a shift register 414, a comparator 415 and a subtracter 416. The shift register 414 includes a first half 417 and a second half 418. Each of the first and second halves 417, 418 includes (R) number of cascaded storage members 419, where (R) is a positive integer. An output of an $(N)^{th}$ one of the storage members 419 is coupled electrically to an input of an $(N+1)^{th}$ one of the storage members 419, where (N) is a positive integer ranging between 1 and (R−1). An output of the $(R)^{th}$ one of the storage members 419 of the first half 417 is coupled electrically to an input of the first one of the storage members 419 of the second half 418. The first half 417 is coupled electrically to the multiplier 412 for receiving the multiplier output therefrom in a first period during the modulus computation processing. The multiplier output is expressed in (R) number of bits, and each bit of the multiplier output is stored in a corresponding one of the storage members 419. Content in each of the storage members 419 is outputted to a subsequent one of the storage members 419 in each of a second period to a $(R+1)^{th}$ period during the modulus computation processing. The comparator 415 is coupled electrically to the second half 418 of the shift register 414 for extracting content in the second half 418 during each of the second period to the $(R+1)^{th}$ period, and determines whether the content is smaller than the public key (N). The subtracter 416 is coupled electrically to the second half 418 of the shift register 414 for extracting the content in the second half 418, and is further coupled electrically to the comparator 415. The subtracter 416 is enabled to subtract the content by the public key (N) and to update the content with result of the subtraction when it is determined by the comparator 415 that the content is not smaller than the public key (N). The second half 418 of the shift register 414 is coupled electrically to the first multiplexer 43, and outputs the content therein as the modulus signal to the first multiplexer 43 when the $(R+1)^{th}$ period has elapsed upon completion of the modulus computation processing.

It should be noted herein that for convenience of description, the lookup tables 222, 36, 63, 723 are arranged in their respective functional blocks, e.g., the lookup table 222 is arranged in the modulus computing unit 22. However, in actual applications, the lookup tables 222, 36, 63, 723 may be concentrated in one hardware block.

In addition, the dividing sub-units 221, 53, 71, and the first and second dividing sub-units 81, 87 can share resources in actual implementations as long as there are no conflicts in timing sequences. Similar principles also apply to the combining unit 23, the combining sub-units 223, 37, 64, 92, and the combining member 724 as well as, to the registers 114, 31, 33, 51, 52, 61, 62, 721, 726, 74, 82, 85, 88.

It should be further noted herein that the encoding device 100 and the decoding device 200 may be implemented as separate modules according to the present invention.

In sum, by incorporating both cryptography and encoding/decoding, the present invention is able to ensure accurate signal transmission and prevent unauthorized access to protected information. In addition, by suitably adopting lookup tables, the present invention simplifies the circuit designs of the error correction encoding module 2 and the error correction decoding module 3.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A communication system comprising:

an encoding device including an encrypting module adapted for encrypting an original signal into an encrypted signal, and an error correction encoding module coupled to said encrypting module for receiving the encrypted signal therefrom, and generating an output signal by performing error correction encoding on the encrypted signal; and a decoding device including an error correction decoding module for receiving an input signal via a transmission channel, the input signal being a result of the output signal combined with noise attributed to the transmission channel, said error correction decoding module generating a recovery signal from the input signal by performing error correction decoding on the input signal, and a decrypting module coupled to said error correction decoding module for receiving the recovery signal therefrom, and generating a decrypted signal that corresponds to the original signal by decrypting a portion of the recovery signal, wherein said encrypting module of said encoding device is adapted for receiving a plurality of bits of an encryption key in sequence from a most significant bit to a least significant bit, and encrypts the original signal into the encrypted signal according to a public key and the encryption key thus received, said encrypting module including: a computing unit adapted for receiving the original signal, the public key, and a multiplexer output signal; a controller coupled electrically to said computing unit, and adapted for receiving the bits of the encryption key in sequence from the most significant bit to the least significant bit; and a first multiplexer coupled electrically to said controller and said computing unit, adapted for receiving the original signal and a modulus signal, and controlled by said controller to output the multiplexer output signal; wherein, for each bit received by said controller and determined by said controller to be a bit other than the most significant bit, said controller controls said computing unit to perform modulus computation processing for generating the modulus signal with reference to the original signal, the public key, and the multiplexer output signal; wherein, when the bit received is a second most significant bit of the encryption key, said controller controls said first multiplexer to output one of the original signal and a predetermined signal as the multiplexer output signal according to a value of the most significant bit of the encryption key, and controls said computing unit to perform the modulus computation processing according to a first modulus computation for generating the modulus signal with reference to the multiplexer output signal and the public key; wherein, when the bit received is the second most significant bit and when a value of the second most significant bit matches a predetermined value, said controller further controls said first multiplexer to output the modulus signal generated according to the first modulus computation as the multiplexer output signal, and further controls said computing unit to perform the modulus computation processing according to a second modulus computation for generating the modulus signal with reference to the original signal, the public key, and the multiplexer output signal; wherein, when the bit received is a bit other than the most significant bit and the second most significant bit of the encryption key, said controller controls said first multiplexer to output the modulus signal as the multiplexer output signal, controls said computing unit to perform the modulus computation processing according to the first modulus computation with reference to the multiplexer output signal and the public key, and further controls said computing unit to perform the modulus computation processing according to the second modulus computation for generating the modulus signal with reference to the original signal, the public key, and the multiplexer output signal when a value of the bit matches the predetermined value and after the modulus computation processing according to the first modulus computation is completed; wherein, upon determining that the bit received is the least significant bit of the encryption key, said controller enables said computing unit to output the modulus signal as the encrypted signal upon completion of the modulus computation processing according to the first modulus computation when a value of the least significant bit does not match the predetermined value, and upon completion of the modulus computation processing according to the second modulus computation when the value of the least significant bit matches the predetermined value.

2. The communication system as claimed in claim 1, wherein said computing unit includes: a second multiplexer adapted for receiving the original signal, coupled electrically to said first multiplexer for receiving the multiplexer output signal therefrom, and further coupled electrically to said controller, said second multiplexer being controlled by said controller to output the multiplexer output signal as a multiplier input signal during the first modulus computation, and to output the original signal as the multiplier input signal during the second modulus computation; a multiplier coupled electrically to said first and second multiplexers for respectively receiving the multiplexer output signal and the multiplier input signal therefrom, and providing a multiplier output corresponding to a product of the multiplexer output signal and the multiplier input signal; and a modulus signal computing sub-unit coupled electrically to said multiplier for receiving the multiplier output therefrom, and computing the modulus signal with reference to the multiplier output thus received and the public key.

3. The communication system as claimed in claim 2, wherein said modulus signal computing sub-unit includes: a shift register including a first half and a second half, each of said first and second halves including (R) number of cascaded storage members, (R) being a positive integer, an output of an (N)th one of said storage members being coupled electrically to an input of an (N+1)th one of said storage members, (N) being a positive integer ranging between 1 and (R−1), an output of the (R)th one of said storage members of said first half being coupled electrically to an input of the first one of said storage members of said second half, said first half being coupled electrically to said multiplier for receiving the multiplier output therefrom in a first period during the modulus computation processing, the multiplier output being expressed in (R) number of bits, each bit of the multiplier output being stored in a corresponding one of said storage members, content in each of said storage members being outputted to a subsequent one of said storage members in each of a second period to a (R+1)th period during the modulus computation processing; a comparator coupled electrically to said second half of said shift register for extracting content in said second half during each of the second period to the (R+1)th period, and determining whether the content is smaller than the public key; and a subtracter coupled electrically to said second half of said shift register for extracting the content in said second half, and further coupled electrically to said comparator, said subtracter being enabled to subtract the content by the public key and to update the content with result of the subtraction when it is determined by said comparator that the content is not smaller than the public key; wherein said second half of said shift register is coupled electrically to said first multiplexer, and outputs the content therein as the modulus signal to said first multiplexer when the (R+1)th period has elapsed upon completion of the modulus computation processing.

4. The communication system as claimed in claim 1, wherein said error correction encoding module of said encoding device includes: a multiplier coupled electrically to said encrypting module for receiving the encrypted signal therefrom, the encrypted signal being represented by an encrypted polynomial, said multiplier multiplying the encrypted polynomial with a first predetermined polynomial so as to generate a multiplication polynomial; a modulus computing unit coupled electrically to said multiplier for receiving the multiplication polynomial therefrom, and determining a remainder of the multiplication polynomial divided by a second predetermined polynomial so as to generate an encoding modulus polynomial; and a combining unit coupled electrically to said multiplier and said modulus computing unit for respectively receiving the multiplication polynomial and the encoding modulus polynomial therefrom, and combining the multiplication polynomial with the encoding modulus polynomial so as to generate an output polynomial, the output polynomial representing the output signal.

5. The communication system as claimed in claim 4, wherein said modulus computing unit includes: a dividing sub-unit coupled electrically to said multiplier for receiving the multiplication polynomial therefrom, and determining a quotient of the multiplication polynomial divided by the second predetermined polynomial so as to generate an encoding quotient polynomial; a lookup table coupled electrically to said dividing sub-unit for receiving the encoding quotient polynomial therefrom, and outputting a multiple polynomial that is representative of a product of the encoding quotient polynomial and the second predetermined polynomial; and a combining sub-unit coupled electrically to said multiplier and said lookup table for respectively receiving the multiplication polynomial and the multiple polynomial therefrom, and generating the encoding modulus polynomial by subtracting the multiple polynomial from the multiplication polynomial.

6. The communication system as claimed in claim 1, wherein the encrypted signal generated by said encrypting module of said encoding device includes (k) number of symbols, and the output signal generated by said error correction encoding module of said encoding device includes (n) number of symbols, (k) and (n) being positive integers, the input signal to be received by said error correction decoding module including (n) number of symbols, said error correction decoding module of said decoding device including: a syndrome determining unit for receiving the input signal via the transmission channel, the input signal being represented by an input polynomial that includes (n) number of terms, said syndrome determining unit determining a syndrome polynomial with reference to the (n) number of terms of the input polynomial and (n−k) number of roots of a predetermined polynomial which is defined in a finite field; an error information determining unit coupled electrically to said syndrome determining unit for receiving the syndrome polynomial therefrom, and determining an error location polynomial and an error value polynomial with reference to the syndrome polynomial and a reference polynomial that is related to (n−k); an error location determining unit coupled electrically to said error information determining unit for receiving the error location polynomial therefrom, and determining at least one error location representative of a corresponding one of the (n) number of terms of the input polynomial; an error value determining unit coupled electrically to said error information determining unit for receiving the error value polynomial and the error location polynomial therefrom, further coupled electrically to said error location determining unit for receiving said at least one error location therefrom, and determining an error value for each of said at least one error location with reference to the error value polynomial, the error location polynomial and a corresponding one of said at least one error location; and a syndrome correcting unit receiving the input signal, and coupled electrically to said error location determining unit and said error value determining unit for respectively receiving said at least one error location and the error value for each of said at least one error location, said syndrome correcting unit determining the recovery signal with reference to the input signal, said at least one error location, and the error value for each of said at least one error location.

7. The communication system as claimed in claim 6, wherein said syndrome determining unit includes: a first shift register for receiving the input polynomial, and including (n) number of cascaded storage members for respectively storing the (n) number of terms of the input polynomial; a syndrome term generator coupled electrically to said first shift register for receiving the input polynomial therefrom, and generating a syndrome term for each of the (n−k) number of roots of the predetermined polynomial; and a second shift register coupled electrically to said syndrome term generator for receiving the syndrome terms for all of the (n−k) number of roots of the predetermined polynomial therefrom, and including (n−k) number of cascaded storage members, each of which stores the syndrome term corresponding to a corresponding one of the (n−k) number of roots, the syndrome terms cooperating to define the syndrome polynomial.

8. The communication system as claimed in claim 7, wherein said syndrome term generator includes: a power generator coupled electrically to said first shift register for receiving in sequence the (n) number of terms of the input polynomial, and generating, for each of the (n) number of terms of the input polynomial, a power signal corresponding to each of the (n−k) number of roots of the predetermined polynomial with reference to power numbers of the corresponding one of the roots of the predetermined polynomial and the corresponding one of the terms of the input polynomial; a lookup table coupled electrically to said first shift register for receiving in sequence the (n) number of terms of the input polynomial, further coupled electrically to said power generator for receiving the power signal therefrom, and outputting, for each of the (n) number of terms of the input polynomial, an intermediate term signal representative of a corresponding one of the (n) number of terms of the input polynomial as substituted by a corresponding one of the (n−k) number of roots of the predetermined polynomial; and a combining sub-unit coupled electrically to said lookup table for combining the intermediate term signals for all of the (n) number of terms of the input polynomial and corresponding to the same one of the (n−k) number of roots so as to result in the syndrome term for the corresponding one of the (n−k)

number of roots to be stored in a corresponding one of the (n–k) number of cascaded storage members of said second shift register.

9. The communication system as claimed in claim 6, wherein said error information determining unit includes an error value polynomial generator that includes a first register, a second register and a dividing sub-unit, said dividing sub-unit being coupled electrically to said first and second registers for determining a remainder of a first polynomial stored in said first register divided by a second polynomial stored in said second register so as to generate a location modulus polynomial, said first register initially storing the reference polynomial as the first polynomial, and being coupled electrically to said second register for updating the first polynomial with the second polynomial, said second register being coupled electrically to said syndrome determining unit for receiving and initially storing the syndrome polynomial as the second polynomial, and being coupled electrically to said dividing sub-unit for updating the second polynomial with the location modulus polynomial, the second polynomial being outputted as the error value polynomial when an order of the second polynomial is smaller than (n–k)/2.

10. The communication system as claimed in claim 9, wherein said dividing sub-unit further determines a quotient of the first polynomial divided by the second polynomial so as to generate a location quotient polynomial, said error information determining unit further including an error location polynomial generator that includes a third register, a fourth register, a lookup table, and a combining sub-unit, said combining sub-unit combining a third polynomial stored in said third register with a location multiple polynomial so as to result in a sum polynomial, said lookup table being coupled electrically to said dividing sub-unit of said error value polynomial generator for receiving the location quotient polynomial therefrom, generating the location multiple polynomial that is representative of the product of a fourth polynomial stored in said fourth register and the location quotient polynomial and that is to be outputted to said combining sub-unit, said third register initially storing zero as the third polynomial, and being coupled electrically to said fourth register for updating the third polynomial with the fourth polynomial, said fourth register initially storing one as the fourth polynomial, and being coupled electrically to said combining sub-unit for updating the fourth polynomial with the sum polynomial, the fourth polynomial being outputted as the error location polynomial when an order of the fourth polynomial is smaller than (n–k)/2.

11. The communication system as claimed in claim 6, wherein said error location determining unit determines said at least one error location by determining whether a corresponding one of (n) number of nonzero elements of the finite field is a root of the error location polynomial, said error location determining unit including: a dividing sub-unit coupled electrically to said error information determining unit for receiving the error location polynomial therefrom, and for performing a division of the error location polynomial by a constant term of the error location polynomial so as to generate a location intermediate polynomial; and a root determining sub-unit coupled electrically to said dividing sub-unit for receiving the location intermediate polynomial therefrom, and generating a test result for each of the (n) number of nonzero elements of the finite field by substituting a corresponding one of the (n) number of nonzero elements into the location intermediate polynomial, said root determining sub-unit outputting the corresponding one of the (n) number of nonzero elements as a corresponding error location reversal element when the test result is zero, the error location reversal element being representative of a corresponding one of said at least one error location.

12. The communication system as claimed in claim 11, wherein said error location determining unit further includes an error location element generator coupled electrically to said root determining sub-unit for receiving the error location reversal element therefrom, and generating an error location element representative of the corresponding one of said at least one error location such that power numbers of the error location element and the error location reversal element have a sum of (n).

13. The communication system as claimed in claim 11, wherein said root determining sub-unit includes: a shift register coupled electrically to said dividing unit for receiving the location intermediate polynomial therefrom; a power generator coupled electrically to said shift register for receiving in sequence a plurality of terms of the location intermediate polynomial therefrom, and generating, for each of the terms of the location intermediate polynomial, a power signal corresponding to each of the (n) number of nonzero elements of the finite field with reference to power numbers of the corresponding one of the nonzero elements of the finite field and the corresponding one of the terms of the location intermediate polynomial; a lookup table coupled electrically to said shift register for receiving in sequence the terms of the location intermediate polynomial, further coupled electrically to said power generator for receiving the power signal therefrom, and outputting, for each of the terms of the location intermediate polynomial, an intermediate term signal representative of a corresponding one of the terms of the location intermediate polynomial as substituted by a corresponding one of the (n) number of nonzero elements of the finite field; and a combining member coupled electrically to said lookup table for combining the intermediate term signals for all of the terms of the location intermediate polynomial and corresponding to the same one of the (n) number of nonzero elements so as to result in the test result for the corresponding one of the (n) number of nonzero elements.

14. The communication system as claimed in claim 11, wherein said error value determining unit includes: a first dividing sub-unit coupled electrically to said error information determining unit for respectively receiving the error value polynomial and the error location polynomial therefrom, and performing division of the error value polynomial by the constant term of the error location polynomial so as to generate an error quotient polynomial; a first determining sub-unit coupled electrically to said first dividing sub-unit and said root determining sub-unit for respectively receiving the error quotient polynomial and the error location reversal element therefrom, and generating a first result by substituting the error location reversal element into the error quotient polynomial; a differentiating sub-unit coupled electrically to said dividing sub-unit for receiving the location intermediate polynomial therefrom, and generating a differential polynomial of the location intermediate polynomial; a second determining sub-unit coupled electrically to said differentiating sub-unit and said root determining sub-unit for respectively receiving the differential polynomial and the error location reversal element therefrom, and generating a second result by substituting the error location reversal element into the differential polynomial; and a second dividing sub-unit coupled electrically to said first and second determining sub-units for receiving the first and second results therefrom, and performing division of the first result by the second result so as to generate the error value for the corresponding one of said at least one error location.

15. The communication system as claimed in claim 6, wherein said syndrome correcting unit includes: a correction polynomial generator coupled electrically to said error location determining unit and said error value determining unit for respectively receiving said at least one error location and the error value therefrom, and outputting the error value as controlled in time by said at least one error location so as to generate a correction polynomial; and a combining sub-unit coupled electrically to said correction polynomial generator for receiving the correction polynomial therefrom, further receiving the input signal that is represented by an input polynomial, and combining the correction polynomial and the input polynomial so as to result in a recovery polynomial representative of the recovery signal.

16. The communication system as claimed in claim 1, wherein said decrypting module of said decoding device is adapted for receiving a plurality of bits of a decryption key in sequence from a most significant bit to a least significant bit, and decrypts the portion of the recovery signal into the decrypted signal according to a public key and the decryption key thus received, said decrypting module including: a computing unit coupled electrically to said error correction decoding module for receiving the recovery signal therefrom, and adapted for receiving the public key and a multiplexer output signal; a controller coupled electrically to said computing unit, and adapted for receiving the bits of the decryption key in sequence from the most significant bit to the least significant bit; and a first multiplexer coupled electrically to said controller and said computing unit, adapted for receiving the recovery signal and a modulus signal, and controlled by said controller to output the multiplexer output signal; wherein, for each bit received by said controller and determined by said controller to be a bit other than the most significant bit, said controller controls said computing unit to perform modulus computation processing for generating the modulus signal with reference to the portion of the recovery signal, the public key, and the multiplexer output signal; wherein, when the bit received is a second most significant bit of the decryption key, said controller controls said first multiplexer to output one of the portion of the recovery signal and a predetermined signal as the multiplexer output signal according to a value of the most significant bit of the decryption key, and controls said computing unit to perform the modulus computation processing according to a first modulus computation for generating the modulus signal with reference to the multiplexer output signal and the public key; wherein, when the bit received is the second most significant bit and when a value of the second most significant bit matches a predetermined value, said controller further controls said first multiplexer to output the modulus signal generated according to the first modulus computation as the multiplexer output signal, and further controls said computing unit to perform the modulus computation processing according to a second modulus computation for generating the modulus signal with reference to the portion of the recovery signal, the public key, and the multiplexer output signal; wherein, when the bit received is a bit other than the most significant bit and the second most significant bit of the decryption key, said controller controls said first multiplexer to output the modulus signal as the multiplexer output signal, controls said computing unit to perform the modulus computation processing according to the first modulus computation with reference to the multiplexer output signal and the public key, and further controls said computing unit to perform the modulus computation processing according to the second modulus computation for generating the modulus signal with reference to the portion of the recovery signal, the public key, and the multiplexer output signal when a value of the bit matches the predetermined value; wherein, upon determining that the bit received is a least significant bit of the decryption key, said controller enables said computing unit to output the modulus signal as the decrypted signal upon completion of the modulus computation processing according to the first modulus computation when a value of the least significant bit does not match the predetermined value, and upon completion of the modulus computation processing according to the second modulus computation when the value of the least significant bit matches the predetermined value.

17. The communication system as claimed in claim 16, wherein said computing unit includes: a second multiplexer adapted for receiving the recovery signal, coupled electrically to said first multiplexer for receiving the multiplexer output signal therefrom, and further coupled electrically to said controller, said second multiplexer being controlled by said controller to output the multiplexer output signal as a multiplier input signal during the first modulus computation, and to output the portion of the recovery signal as the multiplier input signal during the second modulus computation; a multiplier coupled electrically to said first and second multiplexers for respectively receiving the multiplexer output signal and the multiplier input signal therefrom, and providing a multiplier output corresponding to a product of the multiplexer output signal and the multiplier input signal; and a modulus signal computing sub-unit, coupled electrically to said multiplier for receiving the multiplier output therefrom, and computing the modulus signal with reference to the multiplier output thus received and the public key.

18. The communication system as claimed in claim 17, wherein said modulus signal computing sub-unit includes: a shift register including a first half and a second half, each of said first and second halves including (R) number of cascaded storage members, (R) being a positive integer, an output of an (N)th one of said storage members being coupled electrically to an input of an (N+1)th one of said storage members, (N) being a positive integer ranging between 1 and (R−1), an output of the (R)th one of said storage members of said first half being coupled electrically to an input of the first one of said storage members of said second half, said first half being coupled electrically to said multiplier for receiving the multiplier output therefrom in a first period during the modulus computation processing, the multiplier output being expressed in (R) number of bits, each bit of the multiplier output being stored in a corresponding one of said storage members, content in each of said storage members being outputted to a subsequent one of said storage members in each of a second period to a (R+1)th period during the modulus computation processing; a comparator coupled electrically to said second half of said shift register for extracting content in said second half during each of the second period to the (R+1)th period, and determining whether the content is smaller than the public key; and a subtracter coupled electrically to said second half of said shift register for extracting the content in said second half, and further coupled electrically to said comparator, said subtracter being enabled to subtract the content by the public key and to update the content with result of the subtraction when it is determined by said comparator that the content is not smaller than the public key; wherein said second half of said shift register is coupled electrically to said first multiplexer, and outputs the content therein as the modulus signal to said first multiplexer when the (R+1)th period has elapsed upon completion of the modulus computation processing.

19. An encoding device, comprising:
a processor;
an encrypting module coupled to the processor and adapted for encrypting an original signal into an encrypted signal; and
an error correction encoding module coupled to said encrypting module for receiving the encrypted signal therefrom, and generating an output signal by performing error correction encoding on the encrypted signal,
wherein said encrypting module is adapted for receiving a plurality of bits of an encryption key in sequence from a most significant bit to a least significant bit, and encrypts the original signal into the encrypted signal according to the encryption key thus received, said encrypting module including: a computing unit adapted for receiving the original signal, a public key, and a multiplexer output signal; a controller coupled electrically to said computing unit, and adapted for receiving the bits of the encryption key in sequence from the most significant bit to the least significant bit; and a first multiplexer coupled electrically to said controller and said computing unit, adapted for receiving the original signal and a modulus signal, and controlled by said controller to output the multiplexer output signal; wherein, for each bit received by said controller and determined by said controller to be a bit other than the most significant bit, said controller controls said computing unit to perform modulus computation processing for generating the modulus signal with reference to the original signal, the public key, and the multiplexer output signal; wherein, when the bit received is a second most significant bit of the encryption key, said controller controls said first multiplexer to output one of the original signal and a predetermined signal as the multiplexer output signal according to a value of the most significant bit of the encryption key, and controls said computing unit to perform the modulus computation processing according to a first modulus computation for generating the modulus signal with reference to the multiplexer output signal and the public key; wherein, when the bit received is the second most significant bit and when a value of the second most significant bit matches a predetermined value, said controller further controls said first multiplexer to output the modulus signal generated according to the first modulus computation as the multiplexer output signal, and further controls said computing unit to perform the modulus computation processing according to a second modulus computation for generating the modulus signal with reference to the original signal, the public key, and the multiplexer output signal; wherein, when the bit received is a bit other than the most significant bit and the second most significant bit of the encryption key, said controller controls said first multiplexer to output the modulus signal as the multiplexer output signal, controls said computing unit to perform the modulus computation processing according to the first modulus computation with reference to the multiplexer output signal and the public key, and further controls said computing unit to perform the modulus computation processing according to the second modulus computation for generating the modulus signal with reference to the original signal, the public key, and the multiplexer output signal when a value of the bit matches the predetermined value; wherein, upon determining that the bit received is a least significant bit of the encryption key, said controller enables said computing unit to output the modulus signal as the encrypted signal upon completion of the modulus computation processing according to the first modulus computation when a value of the least significant bit does not match the predetermined value, and upon completion of the modulus computation processing according to the second modulus computation when the value of the least significant bit matches the predetermined value.

20. The encoding device as claimed in claim 19, wherein said error correction encoding module includes: a multiplier coupled electrically to said encrypting module for receiving the encrypted signal therefrom, the encrypted signal being represented by an encrypted polynomial, said multiplier multiplying the encrypted polynomial with a first predetermined polynomial so as to generate a multiplication polynomial; a modulus computing unit coupled electrically to said multiplier for receiving the multiplication polynomial therefrom, and determining a remainder of the multiplication polynomial divided by a second predetermined polynomial so as to generate an encoding modulus polynomial; and a combining unit coupled electrically to said multiplier and said modulus computing unit for respectively receiving the multiplication polynomial and the encoding modulus polynomial therefrom, and combining the multiplication polynomial with the encoding modulus polynomial so as to generate an output polynomial, the output polynomial representing the output signal.

21. A decoding device, comprising:
a processor;
an error correction decoding module coupled to the processor and adapted for receiving an input signal via a transmission channel, and generating a recovery signal from the input signal by performing error correction decoding on the input signal; and
a decrypting module coupled to said error correction decoding module for receiving the recovery signal therefrom, and generating a decrypted signal that corresponds to an original signal by decrypting a portion of the recovery signal, the input signal being generated from the original signal by encryption and error correction encoding with the addition of noise attributed to the transmission channel,
wherein the input signal including (n) number of symbols, the original signal including (k) number of symbols, (k) and (n) being positive integers, wherein said error correction decoding module of said decoding device includes: a syndrome determining unit adapted for receiving the input signal, the input signal being represented by an input polynomial that includes (n) number of terms, said syndrome determining unit determining a syndrome polynomial with reference to the (n) number of terms of the input polynomial and (n−k) number of roots of a predetermined polynomial which is defined in a finite field; an error information determining unit coupled electrically to said syndrome determining unit for receiving the syndrome polynomial therefrom, and determining an error location polynomial and an error value polynomial with reference to the syndrome polynomial and a reference polynomial that is related to (n−k); an error location determining unit coupled electrically to said error information determining unit for receiving the error location polynomial therefrom, and determining at least one error location representative of a corresponding one of the (n) number of terms of the input polynomial; an error value determining unit coupled electrically to said error information determining unit for receiving the error value polynomial and the error location polynomial therefrom, further coupled electrically to said error location determining unit for receiving said at least one error location therefrom, and determining an error value for each of said at least one error location with reference to the error value polynomial, the error location polynomial and a corresponding one of said at least one error location; and a syndrome correcting unit adapted for receiving the input signal, and coupled electrically to said error location determining unit and said error value determining unit for respectively receiving said at least one error location and the error value for each of said at least one error location, said syndrome correcting unit determining the recovery signal with reference to the input signal, said at least one error location, and the error value for each of said at least one error location.

* * * * *